(12) United States Patent
Kato

(10) Patent No.: US 10,278,148 B2
(45) Date of Patent: Apr. 30, 2019

(54) WIRELESS COMMUNICATION METHOD AND WIRELESS COMMUNICATION DEVICE

(71) Applicant: Panasonic Intellectual Property Management Co., Ltd., Osaka (JP)

(72) Inventor: Osamu Kato, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 15/516,855

(22) PCT Filed: Sep. 4, 2015

(86) PCT No.: PCT/JP2015/004487
§ 371 (c)(1),
(2) Date: Apr. 4, 2017

(87) PCT Pub. No.: WO2016/067505
PCT Pub. Date: May 6, 2016

(65) Prior Publication Data
US 2017/0303221 A1 Oct. 19, 2017

(30) Foreign Application Priority Data
Oct. 28, 2014 (JP) .................. 2014-219490

(51) Int. Cl.
*H04J 3/06* (2006.01)
*H04W 56/00* (2009.01)
*H04B 1/401* (2015.01)
(Continued)

(52) U.S. Cl.
CPC .......... *H04W 56/001* (2013.01); *H04B 1/401* (2013.01); *H04W 16/14* (2013.01); *H04W 76/10* (2018.02)

(58) Field of Classification Search
CPC .... H04B 1/401; H04W 16/14; H04W 56/001; H04W 76/10
See application file for complete search history.

(56) References Cited

U.S. PATENT DOCUMENTS

| | | | |
|---|---|---|---|
| 8,867,481 | B2 | 10/2014 | Banerjea et al. |
| 9,025,540 | B2 | 5/2015 | Banerjea et al. |
| | | (Continued) | |

FOREIGN PATENT DOCUMENTS

| | | |
|---|---|---|
| JP | 2005-304063 A | 10/2005 |
| JP | 2010-136216 A | 6/2010 |
| | (Continued) | |

OTHER PUBLICATIONS

Koji Yamamoto et al., "M2M Wireless Access Network Consisting of Enormous Number of Terminals," The Journal of Institute of Electronics, Information and Communication Engineers (IEICE), 96(5), May 1, 2013, pp. 330-335 (12 pages). (With English Translation).

*Primary Examiner* — Minh Trang T Nguyen
(74) *Attorney, Agent, or Firm* — Seed IP Law Group LLP

(57) ABSTRACT

Provided is a wireless communication method in a wireless communication device that performs wireless communication in compliance with a prescribed wireless communication specification. A first clock frequency is configured as a clock frequency of an operation clock of the wireless communication device, and a first communication sequence is executed in which a second clock frequency is derived, between the wireless communication device itself and a different wireless communication device, using the first clock frequency. A second clock frequency that is derived in the first communication sequence is configured as the clock frequency of the operation clock of the wireless communication device, and a second communication sequence is executed in which data communication is performed, sub- (Continued)

sequently to the first communication sequence, between the wireless communication device itself and the different wireless communication device, using the second clock frequency.

19 Claims, 18 Drawing Sheets

(51) Int. Cl.
*H04W 76/10* (2018.01)
*H04W 16/14* (2009.01)

(56) References Cited

U.S. PATENT DOCUMENTS

| | | | |
|---|---|---|---|
| 2010/0073229 A1* | 3/2010 | Pattabiraman | G01S 19/11 342/357.64 |
| 2010/0144273 A1 | 6/2010 | Sekikawa et al. | |
| 2012/0201213 A1 | 8/2012 | Banerjea et al. | |
| 2012/0207106 A1 | 8/2012 | Banerjea et al. | |
| 2013/0344880 A1* | 12/2013 | Tamura | H04W 72/0433 455/450 |
| 2015/0296454 A1* | 10/2015 | Lee | H04W 52/0209 370/311 |
| 2015/0304148 A1* | 10/2015 | Vermani | H04L 27/2649 375/340 |

FOREIGN PATENT DOCUMENTS

| | | |
|---|---|---|
| JP | 2010-141758 A | 6/2010 |
| JP | 2014-509131 A | 4/2014 |
| WO | 2011/136267 A1 | 11/2011 |
| WO | 2012/109369 A2 | 8/2012 |

* cited by examiner

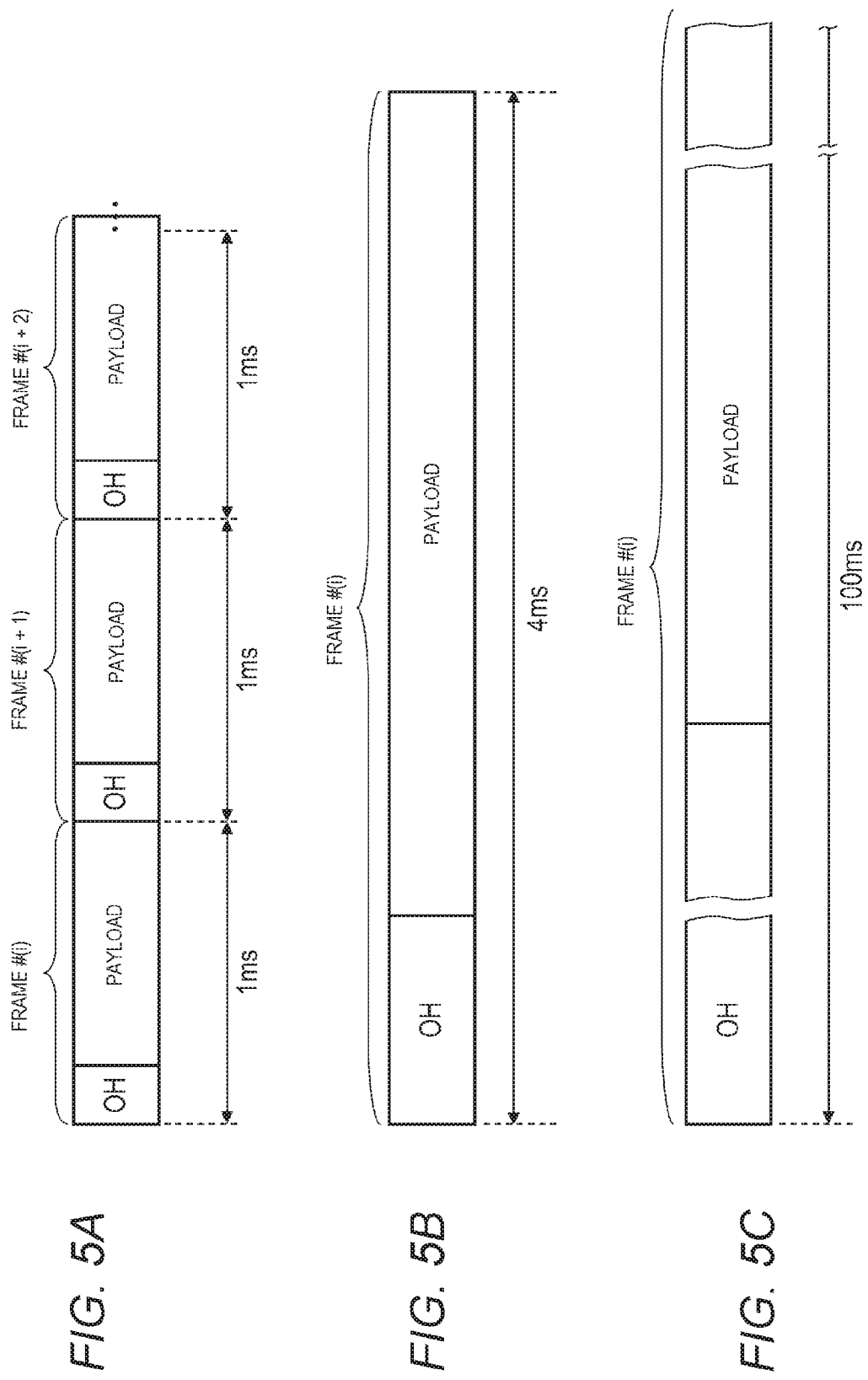

10

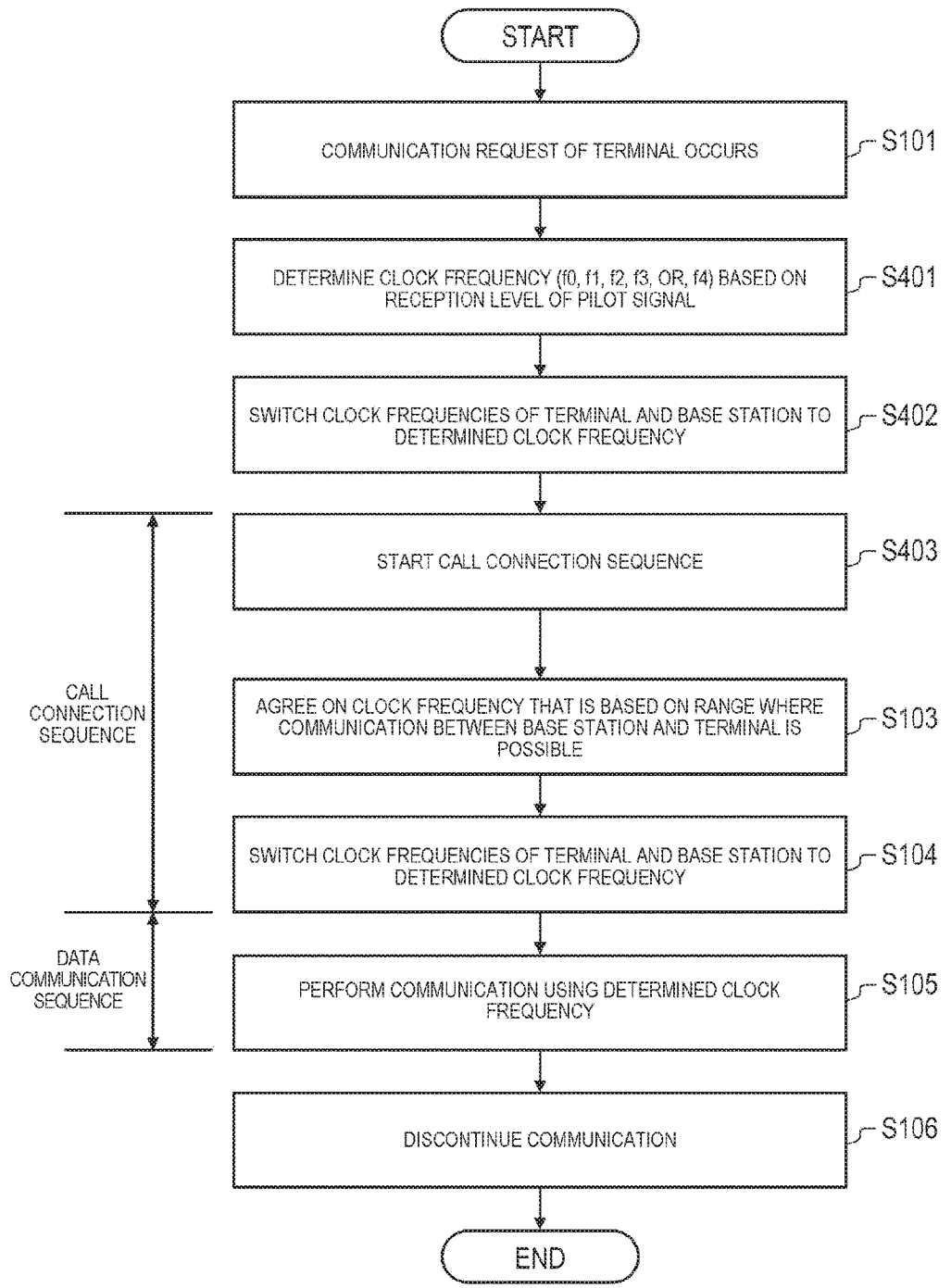

WIRELESS COMMUNICATION METHOD AND WIRELESS COMMUNICATION DEVICE

TECHNICAL FIELD

The present technology relates to a wireless communication method and a wireless communication device.

BACKGROUND ART

In the related art, a communication device communicates with a different communication device in compliance with various communication specifications. The communication specifications, for example, are determined according to an environment where the communication device is installed or a communication purpose. A main index for the communication specification is a transfer speed at which a wireless signal is transferred or a transfer distance over which the wireless signal is transferred.

In the related art, it is known that creation of other new wireless LAN specification are performed using the existing wireless local area network (LAN) specification (refer to NPL 1). In NPL 1, new wireless LAN specifications are created using a scheme that performs down-clocking on a clock frequency at which a wireless LAN device is driven, in such a manner that the clock frequency is decreased to one-half or one-fourth. Accordingly, a communication specification according to which a desired transfer speed or transfer distance is obtained is created.

CITATION LIST

Non-Patent Literature

NPL 1: Koji Yamamoto and Masahiro Morikura, "M2M Wireless Access Network Consisting of Enormous Number of Terminals," The Journal of Institute of Electronics, Information and Communication Engineers (IEICE), Vol. 96 No. 5, P330 to P335, May 1, 2013

SUMMARY OF THE INVENTION

It is difficult to dynamically change a maximum transfer distance for a wireless signal in a method of generating a wireless LAN specification in the related art.

According to a wireless communication method and a wireless communication device in the present technology, a wireless communication method and a wireless communication device are provided in which the maximum transfer distance for the wireless signal can be dynamically changed.

The wireless communication method in the present technology is a wireless communication method in a wireless communication device that performs wireless communication in compliance with a prescribed wireless communication specification. A first clock frequency is configured as a clock frequency of an operation clock of the wireless communication device, and a first communication sequence is executed in which a second clock frequency is derived, between the wireless communication device itself and a different wireless communication device, using the first clock frequency. The second clock frequency that is derived in the first communication sequence is configured as the clock frequency of the operation clock of the wireless communication device, and a second communication sequence is executed in which data communication is performed, subsequently to the first communication sequence, between the wireless communication device itself and a different wireless communication device, using the second clock frequency.

A wireless communication device in the present technology, which is a wireless communication device that performs wireless communication in compliance with a prescribed wireless communication specification, includes a configuration unit that configures a first clock frequency as a clock frequency of an operation clock of the wireless communication device and that causes a change from the first clock frequency and thus configures a second clock frequency; a communication unit that communicates first data relating to a first communication sequence in which a second clock frequency is derived, between the wireless communication device itself and a different wireless communication device, using the first clock frequency, and that communicates second data relating to a second communication sequence in which data communication is performed, subsequently to the first communication sequence, between the wireless communication device itself and the different wireless communication device, using the second clock frequency; and a derivation unit that derives the second clock frequency based on the first data.

According to the wireless communication method and the wireless communication device in the present technology, the transfer distance for the wireless signal can be dynamically changed.

BRIEF DESCRIPTION OF DRAWINGS

FIG. 5A is a schematic diagram illustrating one example of a frame format of the wireless signal according to the first exemplary embodiment.

FIG. 5B is a schematic diagram illustrating one example of the frame format of the wireless signal according to the first exemplary embodiment.

FIG. 5C is a schematic diagram illustrating one example of the frame format of the wireless signal according to the first exemplary embodiment.

FIG. 14 is a sequence diagram illustrating an operation example of operation of a wireless communication system according to the second exemplary embodiment.

DESCRIPTION OF EMBODIMENTS

Exemplary embodiments will be described below with reference to the drawings.

In wireless communication, for example, in a case where, as a condition, a prescribed transfer speed (for example, 3 Mbps) may be achieved or a prescribed transfer distance (for example, 200 m) may be achieved, either of the transfer speed or the transfer distance is not often achieved. For this reason, various communication specifications for achieving both of the prescribed transfer speed and transfer distance have been stipulated for each requirement.

In recent years, many communication systems in which an increase in the transfer speed makes the increasing quality of audio data or image data realized are present. On the other hand, communication in which, although the transfer speed is comparatively low, a trouble is seldom caused, is present as well, such as communication for a control signal or for sensor-detected information. In a case where, although the transfer speed is low, the trouble is seldom caused, there can be a situation in which it is preferable that the transfer distance is increased, to some degree at the expense of the transfer speed.

In NPL 1, in order to change the transfer speed or the transfer distance, for example, there is a need to change wireless LAN specifications from Institute of Electrical and Electronics Engineers (IEEE) 802.11ac to IEEE 802.11p. Therefore, because the wireless LAN specifications are changed each time the transfer distance is changed, it is difficult to dynamically change the wireless LAN specifications that are one time adopted, and it is difficult to dynamically change the transfer distance.

A wireless communication method and a wireless communication device, in which the distance that a wireless signal is to be transferred can be dynamically changed will be described below.

First Exemplary Embodiment

Figure 1:
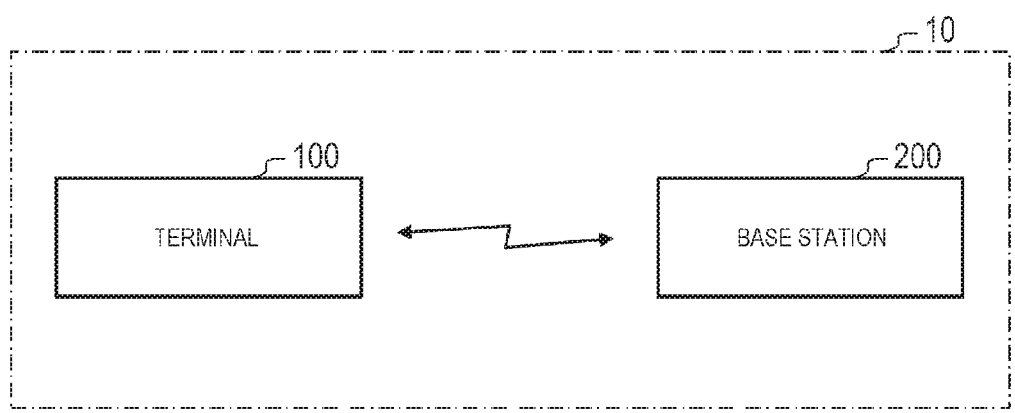
FIG. 1 is a block diagram illustrating an example of a wireless communication system according to a first exemplary embodiment.

FIG. 1 is a block diagram illustrating an example of a wireless communication system 10 according to a first exemplary embodiment. Wireless communication system 10 includes one or more terminals 100 and one or more base stations 200. In FIG. 1, only one terminal 100 and only one base station 200 are illustrated.

Terminal 100 and base station 200 are connected to each other through a network. Each of terminal 100 and base station 200 is one example of the wireless communication device.

Terminal 100 and base station 200 perform the wireless communication in compliance with a prescribed wireless communication specification. The wireless communication specifications, for example, include Long Term Evolution (LTE), a wireless LAN, and Digital Enhanced Cordless Telecommunication (DECT).

Figure 2:
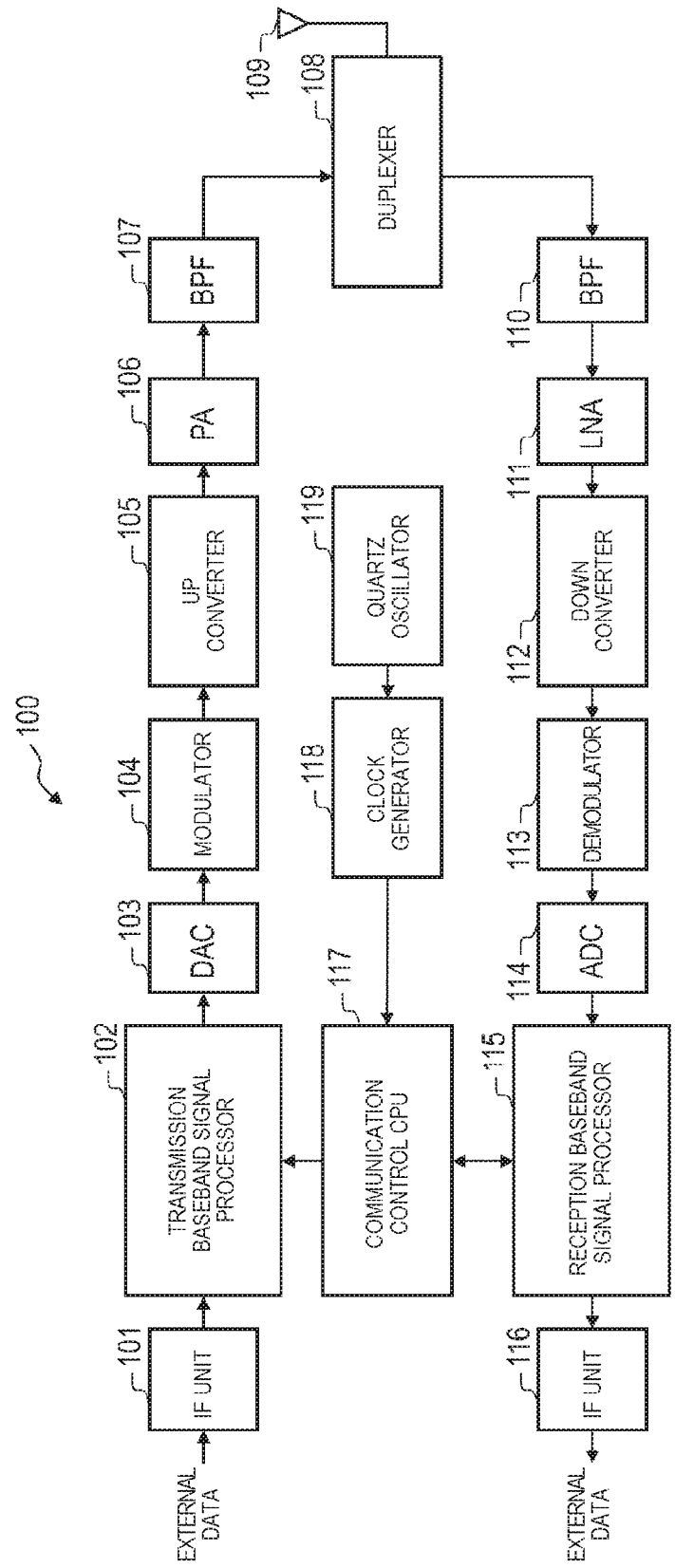
FIG. 2 is a block diagram illustrating an example of a terminal according to the first exemplary embodiment.

FIG. 2 is a block diagram illustrating an example of terminal 100. Terminal 100 includes Interface (IF) 101, transmission baseband signal processor 102, Digital to Analog Converter (DAC) 103, modulator 104, up converter 105, Power Amplifier (PA) 106, Band Pass Filter (BPF) 107, duplexer 108, and antenna 109. Terminal 100 includes BPF 110, Low Noise Amplifier (LNA) 111, down converter 112, demodulator 113, Analog to Digital Converter (ADC) 114, reception baseband signal processor 115, and interface (IF) 116. Terminal 100 includes communication control Central Processing Unit (CPU) 117, clock generator 118, and quartz oscillator 119. Terminal 100 may not include BPF 107.

IF 101, for example, acquires data (external data) from a storage medium, which is not illustrated, an operation unit, which is not illustrated, or and an application, which is not illustrated, and sends the received data to transmission baseband signal processor 102.

Based on a control signal from communication control CPU 117, transmission baseband signal processor 102 performs various signal processing operations (baseband signal processing operations) in a baseband frequency on data from IF 101. The baseband signal processing operations, for example, include coding processing.

DAC 103 converts data (digital data) on which the base band signal processing is preformed, into an analog signal.

Modulator 104 modulates the analog signal from DAC 103 in compliance with a prescribed modulation scheme. Modulation schemes, for example, include orthogonal modulation. The orthogonal modulation, for example, includes Quadrature Phase Shift Keying (QPSK) and Quadrature Amplitude Modulation (QAM).

Up converter 105 increases a frequency of the data in the baseband frequency (BB frequency), which is modulated by modulator 104, and generates data in a high frequency (Radio Frequency (RF)) band (carrier frequency band).

PA 106, for example, amplifies a signal power of the data in the high frequency band from up converter 105, and performs maintenance in such a manner that a transmit power of a transmission signal which includes that data is a prescribed value which is equal to or lower than a maximum value. PA 106 may perform the maintenance in such a manner that power density of the transmission signal is at a prescribed value within the range that is permitted in the wireless communication specification.

For example, based on a communication band and a bandwidth in the wireless communication specification, which is adopted by terminal 100, BPF 107 performs filtering in such a manner that a signal (a transmission signal) within a prescribed frequency range is allowed to pass through and a signal outside of the prescribed frequency range is filtered out.

Duplexer 108, for example, is a component for sharing antenna 109 between a transmission system and a reception system in terminal 100. Duplexer 108 separates a signal that is received by antenna 109 and a signal that is transmitted from antenna 109.

For example, based on the communication band and the bandwidth in the wireless communication specification, which is adopted by terminal 100, BPF 110 performs the filtering in such a manner that a signal (a reception signal) within a prescribed frequency range is allowed to pass through and a signal outside of the prescribed frequency range is filtered out.

LNA 111 amplifies the signal from BPF 110.

Down converter 112 decreases a frequency of a signal in the high frequency band that is the signal from LNA 111, and generates a signal in the baseband frequency.

Demodulator 113 demodulates data in the baseband frequency from down converter 112, in compliance with a prescribed demodulation scheme. Demodulation schemes, for example, include orthogonal demodulation (for example, QPSK or QAM).

ADC 114 converts the data (analog signal) from demodulator 113 into digital data.

Reception baseband signal processor 115 performs the baseband signal processing on the data from ADC 114. The baseband signal processing operations, for example, include decoding processing.

IF 116, for example, sends the data from reception baseband signal processor 115, as external data, to various storage media, various display media, or various applications, which are not illustrated.

Communication control CPU 117 executes a program that is stored in a Read Only Memory (ROM) or a Random Access Memory (RAM) that terminal 100 has, which is not illustrated, and thus executes various control operations relating to communication.

Communication control CPU 117, for example, controls a call connection sequence in which terminal 100 and base station 200 perform the wireless communication. Communication control CPU 117, for example, executes control relating to communication (also referred to simply as data communication) of user data after executing the call connection sequence. Communication control CPU 117, for example, executes control relating to handover (HO).

Communication control CPU 117, for example, functions as a configuration unit that configures first and second clock frequencies that will be described below. Communication control CPU 117, for example, functions as a derivation unit that derives a clock frequency that will be described below.

Clock generator 118 generates an operation clock at which terminal 100 operates, based on a clock source from quartz oscillator 119. Clock generator 118, for example, sets a frequency, which results from multiplying a frequency of the clock source by a prescribed number (for example, 200), to be a frequency of the operation clock (the clock frequency). Clock generator 118, for example, may dynamically change a clock frequency, based on the control signal from communication control CPU 117.

Quartz oscillator 119 generates a clock source that has a prescribed frequency (for example, 13 MHz), and sends the generated clock source to clock generator 118.

In terminal 100, IF 101, transmission baseband signal processor 102, DAC 103, modulator 104, up converter 105, PA 106, BPF 107, duplexer 108, and antenna 109 constitute a transmitter. Furthermore, duplexer 108, antenna 109, BPF 110, LNA 111, down converter 112, demodulator 113, ADC 114, reception baseband signal processor 115, and IF 116 constitute a receiver. The transmitter and the receiver constitute a communication unit of terminal 100. Communication by the communication unit of terminal 100 is controlled by communication control CPU 117.

Figure 3:
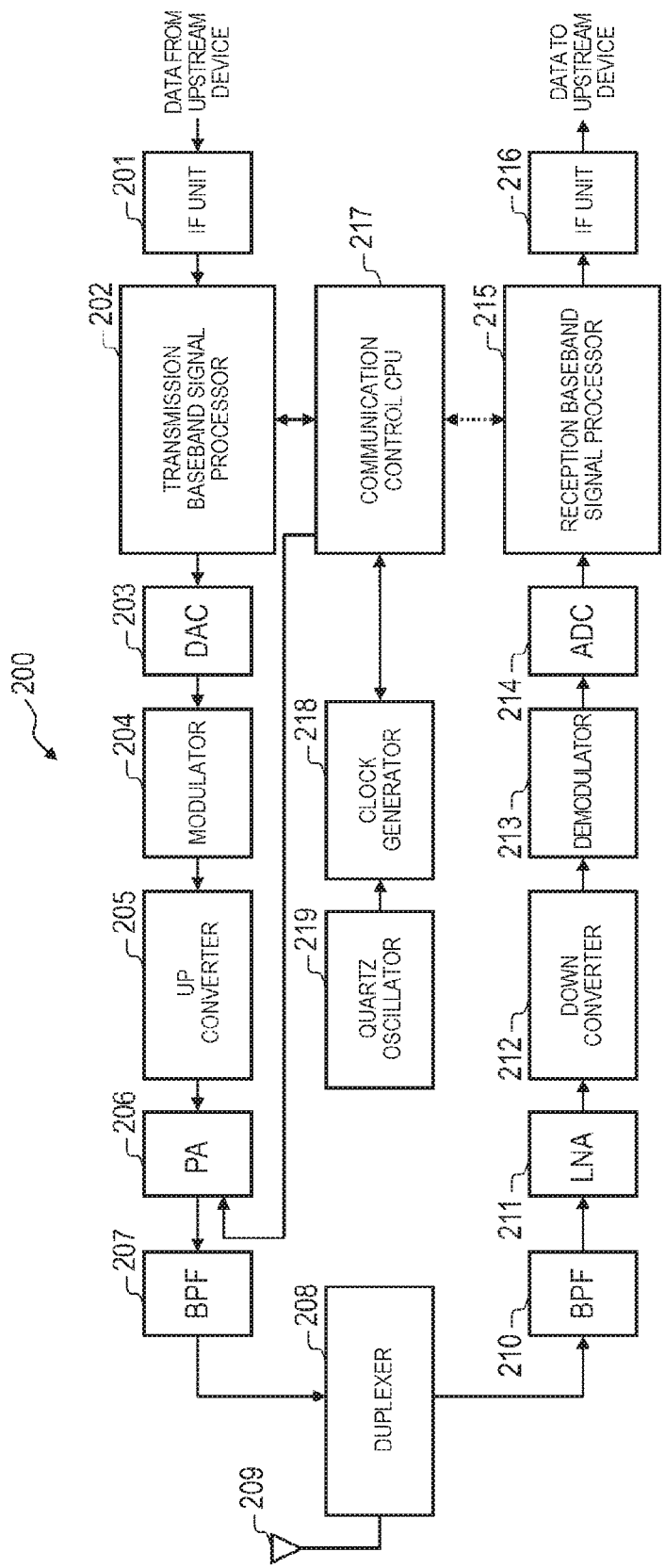
FIG. 3 is a block diagram illustrating an example of a base station according to the first exemplary embodiment.

FIG. 3 is a block diagram illustrating an example of a constitution of base station 200. Base station 200 includes IF 201, transmission baseband signal processor 202, DAC 203, modulator 204, up converter 205, PA 206, BPF 207, duplexer 208, and antenna 209. Base station 200 includes BPF 210, LNA 211, down converter 212, demodulator 213, ADC 214, reception baseband signal processor 215, and IF 216. Base station 200 includes communication control CPU 217, clock generator 218, quartz oscillator 219. Moreover, base station 200 may not include BPF 207.

IF 201, for example, acquires data from an upstream device that is not illustrated and sends the acquired data to transmission baseband signal processor 202. The upstream device, for example, a Radio Network Controller (RNC) and a Serving Gateway (S-GW).

Transmission baseband signal processor 202 performs the baseband signal processing on the data from IF 201, based on the control signal from communication control CPU 217. Baseband signal processing operations, for example, include the coding processing.

DAC 203 converts data (digital data) on which the base band signal processing is preformed, into an analog signal.

Modulator 204 modulates the analog signal from DAC 203 in compliance with a prescribed modulation scheme. The modulation schemes, for example, include the orthogonal modulation. The orthogonal modulation, for example, includes QPSK and QAM.

Up converter 205 increases a frequency of data in the baseband frequency, which is modulated by modulator 204, and generates data in the high frequency band.

PA 206, for example, amplifies a signal power of the data in the high frequency band from up converter 205, and performs the maintenance in such a manner that a transmit power of a transmission signal which includes that data is approximately constant. PA 206 may perform the maintenance in such a manner that the power density of the transmission signal is approximately constant.

For example, based on the communication band and the bandwidth in the wireless communication specification, which is adopted by base station 200, BPF 207 performs the filtering in such a manner that a signal (a transmission signal) within a prescribed frequency range is allowed to pass through and a signal outside of the prescribed frequency range is filtered out.

Duplexer 208, for example, is a component for sharing antenna 209 between a transmission system and a reception system in base station 200. Duplexer 208 separates a signal that is received by antenna 209 and a signal that is transmitted from antenna 209.

For example, based on the communication band and the bandwidth in the wireless communication specification, which is adopted by base station 200, BPF 210 performs the filtering in such a manner that a signal (a reception signal)

within a prescribed frequency range is allowed to pass through and a signal outside of the prescribed frequency range is filtered out.

LNA 211 amplifies the signal from BPF 210.

Down converter 212 decreases a frequency of a signal in the high frequency band that is the signal from LNA 211, and generates a signal in the baseband frequency.

Demodulator 213 demodulates data in the baseband frequency from down converter 212, in compliance with a prescribed demodulation scheme. Demodulation schemes, for example, include the orthogonal modulation. The orthogonal modulation, for example, includes QPSK and QAM.

ADC 214 converts the data (analog signal) from demodulator 213 into digital data.

Reception baseband signal processor 215 performs the baseband signal processing on the data from ADC 214. Baseband signal processing operations, for example, include the decoding processing.

IF 216, for example, sends the data from reception baseband signal processor 215 to the upstream device, which is not illustrated. The upstream device, for example, includes an RNC and an S-GW.

Communication control CPU 217 executes a program that is stored in a ROM or a RAM that base station 200 has, which is not illustrated, and thus executes various control operations relating to communication.

Communication control CPU 217, for example, controls the call connection sequence in which terminal 100 and base station 200 perform the wireless communication. Communication control CPU 217, for example, executes the control relating to the communication (also referred to simply as the data communication) of the user data after executing the call connection sequence. Communication control CPU 217, for example, executes the control relating to the handover (HO).

Clock generator 218 generates an operation clock at which base station 200 operates, based on a clock source from quartz oscillator 219. Clock generator 218, for example, sets a frequency, which results from multiplying a frequency of the clock source by a prescribed number (for example, 200), to be a clock frequency. Clock generator 218, for example, may change the clock frequency, based on the control signal from communication control CPU 217.

Quartz oscillator 219 generates a clock source that has a prescribed frequency (for example, 13 MHz), and sends the generated clock source to clock generator 218.

In base station 200, IF 201, transmission baseband signal processor 202, DAC 203, modulator 204, up converter 205, PA 206, BPF 207, duplexer 208, and antenna 209 constitute a transmitter. Furthermore, duplexer 208, antenna 209, BPF 210, LNA 211, down converter 212, demodulator 213, ADC 214, reception baseband signal processor 215, and IF 216 constitute a receiver. The transmitter and the receiver constitute a communication unit of base station 200. Communication by the communication unit of base station 200 is controlled by communication control CPU 217.

Next, a relationship between a frequency bandwidth and power density of the wireless signal, which are managed by wireless communication system 10, is described.

Figure 4A:
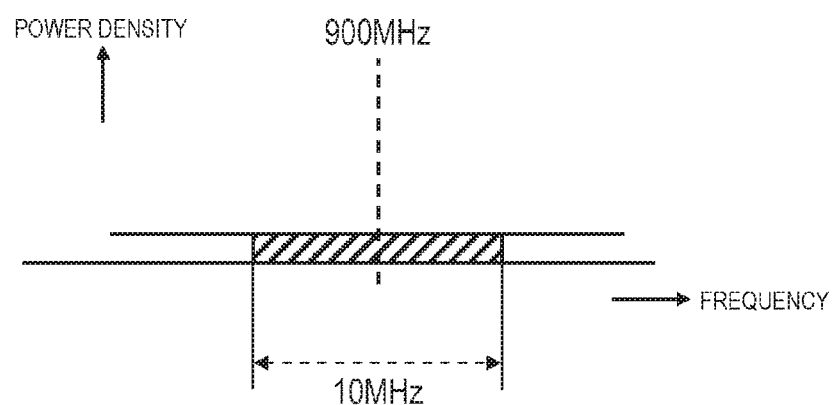
FIG. 4A is a schematic diagram illustrating one example of a relationship between a frequency bandwidth and a power density of a wireless signal that is handled by the wireless communication system according to the first exemplary embodiment.
Figure 4B:
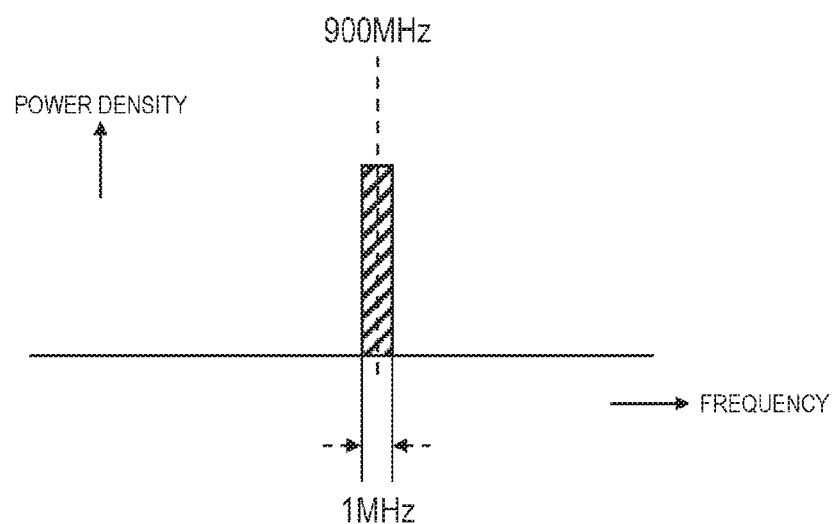
FIG. 4B is a schematic diagram illustrating one example of the relationship between the frequency bandwidth and the power density of the wireless signal that is handled by the wireless communication system according to the first exemplary embodiment.

FIGS. 4A and 4B illustrate one example of the relationship between the frequency bandwidth and the power density of the wireless signal. FIG. 4A illustrates a case where the frequency bandwidth is comparatively wide (for example, 10 MHz). FIG. 4B illustrates a case where the frequency bandwidth is comparatively narrow (for example, 1 MHz).

In any one of FIGS. 4A and 4B, a communication frequency band (a carrier frequency band) of the wireless signal, for example, is 900 MHz or 1.7 GHz. In any one of FIGS. 4A and 4B, a power of one wireless signal is 1 W (watt).

More precisely, if the transmit power is constant, when the frequency bandwidth of the wireless signal is wide, the power density is low, and when the frequency bandwidth of the wireless signal is narrow, the power density is high. A maximum transfer distance in a case where the wireless signal is communicated is proportional to a degree of power density. Therefore, when the frequency bandwidth in which the wireless signal is communicated changes, the maximum transfer distance changes. An actual transfer distance that terminal 100 and base station 200 transfer a signal is a distance that ranges between 0 and the maximum transfer distance.

Furthermore, when the clock frequencies that are generated by clock generators 118 and 218 are low, the frequency bandwidth is narrow. When the clock frequency is high, the frequency bandwidth is wide. Therefore, communication control CPUs 117 and 217 can control the operation clock, and thus can control the maximum transfer distance.

PA 106, for example, includes a PA that maintains approximate constancy of the transmit power, or a PA that maintains approximate constancy of the power density. In a case where PA 106 maintains the approximate constancy of the transmit power, when, for example, the frequency bandwidth of the wireless signal is narrow, the power density corresponds to the frequency bandwidth, and thus is high (refer to FIGS. 4A and 4B). In a case where PA 106 maintains the approximate constancy of the power density, although the frequency bandwidth is narrow, because the power density is not high in a manner that corresponds to the frequency bandwidth, communication control CPU 117, for example, performs control in such a manner that transmission baseband signal processor 102 or PA 106 increases the power density within the range that is permitted in the wireless communication specification. Transmission baseband signal processor 102 processes the digital signal, and PA 106 processes the analog signal.

The narrowing of the frequency bandwidth in the condition that a maximum value of the transmit power be not increased can reduce a leakage power to outside of a system band. For this reason, at the present time, if specification changes occur even in the wireless communication specification in which a maximum value of transmit power density is stipulated, in such a manner that the maximum value of the transmit power density can be increased, application of the present exemplary embodiment is possible in which the transmit power density is increased within the range that is newly stipulated in the wireless communication specification.

In this manner, when communication control CPUs 117 and 217 increase the clock frequency, the frequency bandwidth is wide, the power density is low, the maximum transfer distance is short, and an amount of information that is able to be communicated is large. On the other hand, when communication control CPUs 117 and 217 decrease the clock frequency, the frequency bandwidth is narrow, the power density is high, the amount of information that is able to be communicated is small, and the maximum transfer distance is large. In changing the operation clock, there is no need to change the wireless communication specification. Therefore, terminal 100 and base station 200 can make the maximum transfer distance changeable without changing the wireless communication specification (a frame format or a communication protocol) that is adopted.

Furthermore, communication control CPUs 117 and 217 decrease the clock frequency, and thus the frequency bandwidth is narrow. This can reduce communication interference to the frequency band adjacent to the wireless signal whose frequency bandwidth is narrow, and thereby can improve communication performance. Moreover, in a case where a plurality of communication devices (for example, terminal 100 and base station 200) share the same frequency band, if that communication device is not for Code Division Multiple Access (CDMA) communication, each of communication devices does not perform communication at the same timing on the time axis.

Next, a frame format of the wireless signals that is communicated by each of terminal 100 and base station 200 is described.

FIGS. 5A to 5C illustrate one example of the frame format of the wireless signal. The wireless signals, for example, include a transmission signal and a reception signal. In FIGS. 5A to 5C, in a case where the modulation scheme and the demodulation scheme of terminal 100 and base station 200 is other than OFDM, the frame format for every carrier is illustrated. In a case where the modulation scheme and the demodulation scheme of terminal 100 and base station 200 are for OFDM, the frame format for every carrier is illustrated.

FIG. 5A illustrates a case where the clock frequency is f (Hz). In FIG. 5A, each frame includes an overhead region and a payload region. The overhead region, for example, is approximately ten to twenty percent of the number of bits that are included in the frame, and, for example, includes control data. The payload region, for example, includes real data such as user data.

FIG. 5A illustrates that a frame length is 1 ms, but the frame length is not limited to this. In a case where the frame length is 1 ms and one frame is 1000 bits, a maximum transfer speed of each of terminal 100 and base station 200 is 1 Mbps. A real transfer speed of the wireless signal that is communicated by each of terminal 100 and base station 200 is a speed between 0 and the maximum transfer speed.

FIG. 5B illustrates a case where the clock frequency is ($\frac{1}{4}$) f (Hz). In FIG. 5B, as in FIG. 5A, each frame includes the overhead region and the payload region.

FIG. 5B illustrates that the frame length is 4 ms, but the frame length is not limited to this. In a case where the frame length is 4 ms and one frame is 1000 bits, the maximum transfer speed is 250 kbps.

FIG. 5C illustrates a case where the clock frequency is ($\frac{1}{100}$) f (Hz). In FIG. 5C, as in FIGS. 5A and 5B, each frame includes the overhead region and the payload region.

FIG. 5C illustrates that the frame length is 100 ms, but the frame length is not limited to this. In a case where the frame length is 100 ms and one frame is 1000 Bits, the maximum transfer speed is 10 kbps.

In the communication of the wireless signal in free space, a relationship between the power density and the maximum transfer distance follows a square law. For example, when a value of the power density of the wireless signal increases at double digits, the transfer distance increases at one digit.

Terminal 100 and base station 200, for example, configures the clock frequency to be $\frac{1}{10}$ or $\frac{1}{100}$, and thus the communication frequency band that is used by each of terminal 100 and base station 200 is narrow. Because of this, the likelihood that the communication interference will occur can be reduced, and the transfer distance can be increased.

For example, in a case where the wireless communication specification that is adopted by terminal 100 and base station 200 are for LTE, a basic operation clock frequency at the normal time is 30.72 MHz. The maximum transfer speed, for example, depends on a system bandwidth, a modulation scheme that is adoptable, and the number of Multiple Input Multiple Output (MIMO) antennas, and for example, is 50 Mbps. MIMO is a technology that increases the transfer speed using a plurality of antennas for transmission and reception.

Next, an application example of wireless communication system 10 is described.

In the following application example and a comparative example that is compared against the application example, the wireless communication system has one or more base stations (Base stations (BS)) and one or more terminals T. The BS, for example, performs the wireless communication with other BSs, terminals, and other communication devices. A BS in the application example is one example of base station 200. Terminal T in the application example is one example of terminal 100. The following application example and the comparative example that is compared against the application example may apply to the communication between the terminals.

Figure 6A:
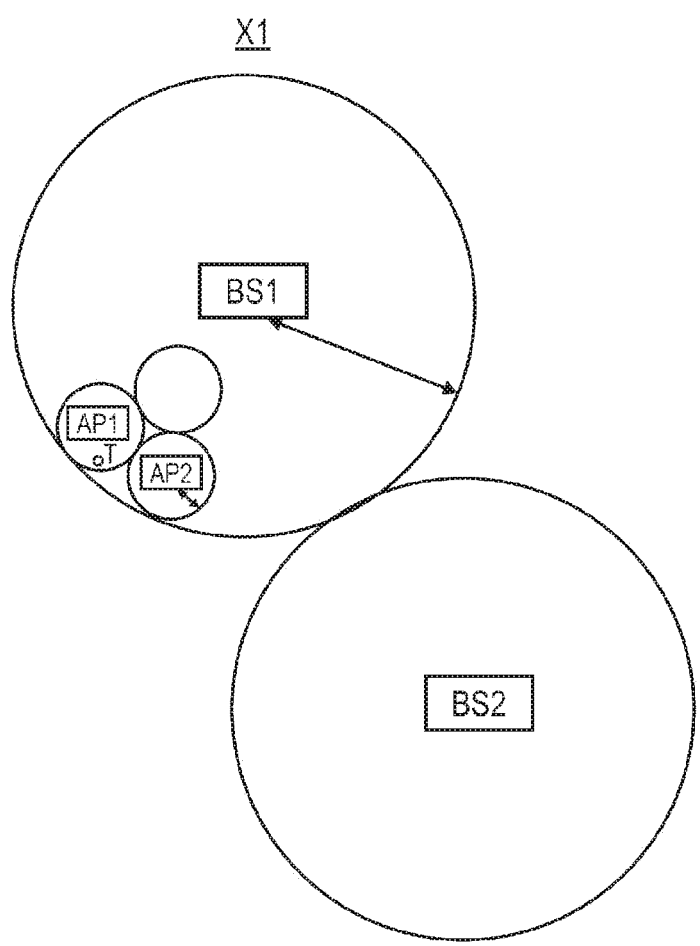
FIG. 6A is a schematic diagram for describing a first application example of the wireless communication system according to the first exemplary embodiment.
Figure 6B:
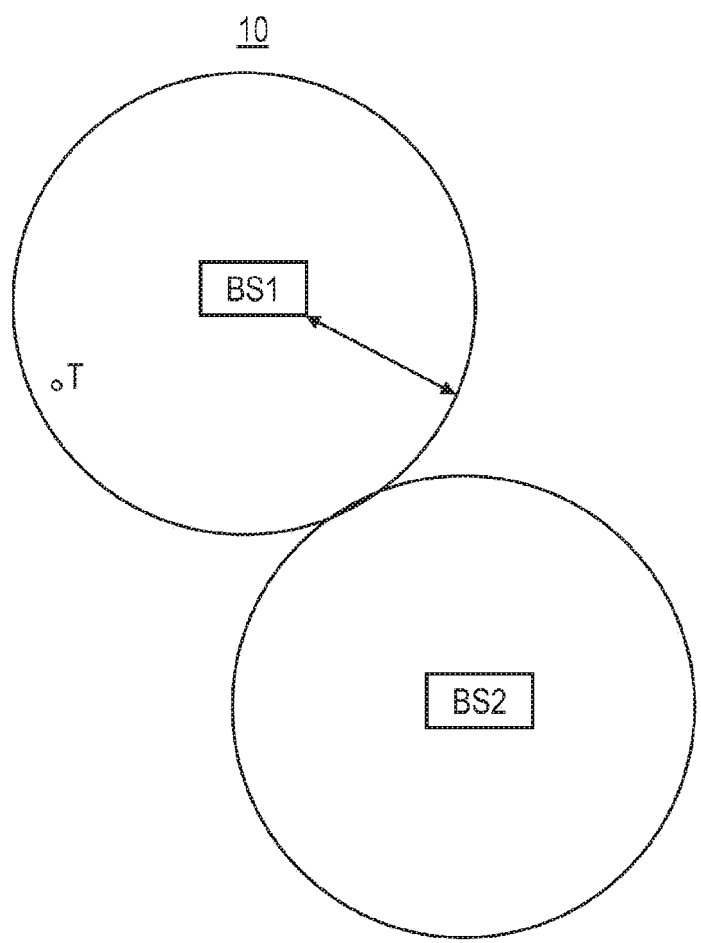
FIG. 6B is a schematic diagram for describing the first application example of the wireless communication system according to the first exemplary embodiment.

FIGS. 6A and 6B are schematic diagrams for describing a first application example of wireless communication system 10. In the first application example, it is considered that terminal T performs the wireless communication using the frequency in white space. Whether or not to use the WS, for example, is determined based on information that is retained in a database (DB) (not illustrated) for the white space (WS), which manages information on a frequency in the available white space.

FIG. 6A illustrates an outline of wireless communication system X1 in a first comparative example which is compared against the first application example.

In wireless communication system X1, BSs (BS1, BS2, and so forth), for example, perform the wireless communication with other BSs or communication devices that are arranged in various networks, using a prescribed frequency band (for example, the white space (for example, 470 MHz to 710 MHz)). For example, because a radio wave propagation loss is smaller in the white space frequency band than is the case with the wireless communication specification for the high frequency band such as 5 GHz, the maximum transfer distance in the wireless communication specification that uses the white space is comparatively long, and for example, is 300 m. More precisely, a radius of an area where the BS is able to perform the communication, for example, is 300 m with the BS in the center.

Wireless communication system X1 has one or more Access Points (AP) in the area where the BS is able to perform the communication. APs (AP1, AP2, and so forth), for example, perform the wireless communication with the BSs or with terminals T using a prescribed frequency band (for example, the 5 GHz band). The maximum transfer distance in the wireless communication specification that uses the 5 GHz band, for example, forms a circle of a 30 m radius. More precisely, the radius of the area where the AP is able to perform the communication, for example, is 30 m with the AP in the center.

An operation example of operation of wireless communication system X1 in the first comparative example is described.

For example, terminal T makes a wireless connection to AP1 in compliance with the wireless communication specification that uses the 5 GHz band, accesses the DB for the WS, and discriminates the frequency in the available white space. Terminal T makes a wireless connection to BS1 in compliance with the wireless communication specification that uses the white space, and performs the data communication with BS1 using the frequency in the available white space that is discriminated.

FIG. 6B illustrates an outline of wireless communication system 10 in the first application example. In wireless communication system 10, the BSs (BS1, BS2, and so forth) performs the wireless communication with other communication devices using a prescribed frequency band (for example, the 5 GHz band that is the white space).

The maximum transfer distance in the wireless communication specification that uses the white space, for example, 300 m. More precisely, the radius of the area where the BS is able to perform the communication, for example, is 300 m with the BS in the center. Furthermore, the maximum transfer distance in the wireless communication specification that uses the 5 GHz, for example, is 30 m at the normal time, but, by reducing the operation clock of terminal T or the BS (reducing the clock frequency), more precisely, by reducing the clock frequency, can be increased to 300 m.

The example of the operation of wireless communication system 10 in the first application example is described.

For example, terminal T makes a wireless connection to BS1 in compliance with the wireless communication specification that uses the 5 GHz band, accesses the DB for the WS, and discriminates the frequency in the available white space. In this case, terminal T performs the wireless communication in a case where the operation clock is reduced. For example, the maximum transfer distance is normally 30 m, but, by reducing operation clock, the maximum transfer distance, can be set to be 300 m. Thus, the maximum transfer distance can be increased. Terminal T makes a wireless connection to BS1 in compliance with the wireless communication specification that uses the white space, and performs the data communication with BS1 using the frequency in the WS that is discriminated.

According to the first application example, although an AP that corresponds to the wireless communication specification that uses the 5 GHz band which is necessary in installing a station at high density is not present, terminal 100 can access the DB for the WS. Therefore, the number of installed APs can be reduced, the cost of installing the AP can be reduced, and the communication that uses the frequency in the white space can be used.

Furthermore, terminal 100, for example, does not need to access the DB for the WS using a satellite circuit, and can reduce the cost that incurs in accessing the DB for the WS. Furthermore, even in areas (for example, suburbs, a mountainous area, a desert region, and a densely wooded region) where it is difficult to install a station at a high density, terminal 100 can easily perform the communication with base station 200.

Furthermore, terminal 100 can reduce the number of clock frequencies of terminal 100, and thus, for example, can increase the maximum transfer distance in the wireless communication specification (for example, the wireless LAN) that uses the 5 GHz. Therefore, for example, the wireless communication specification for the communication for securing the frequency in the available white space and that for the communication which uses the white space can be set to be the same wireless communication specification, and a wireless circuit scale of terminal 100 or base station 200 can be reduced.

Figure 7A:
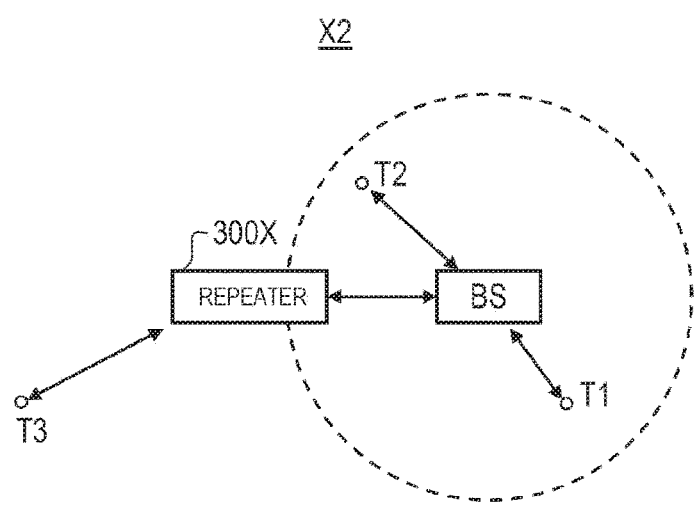
FIG. 7A is a schematic diagram for describing a second application example of the wireless communication system according to the first exemplary embodiment.
Figure 7B:
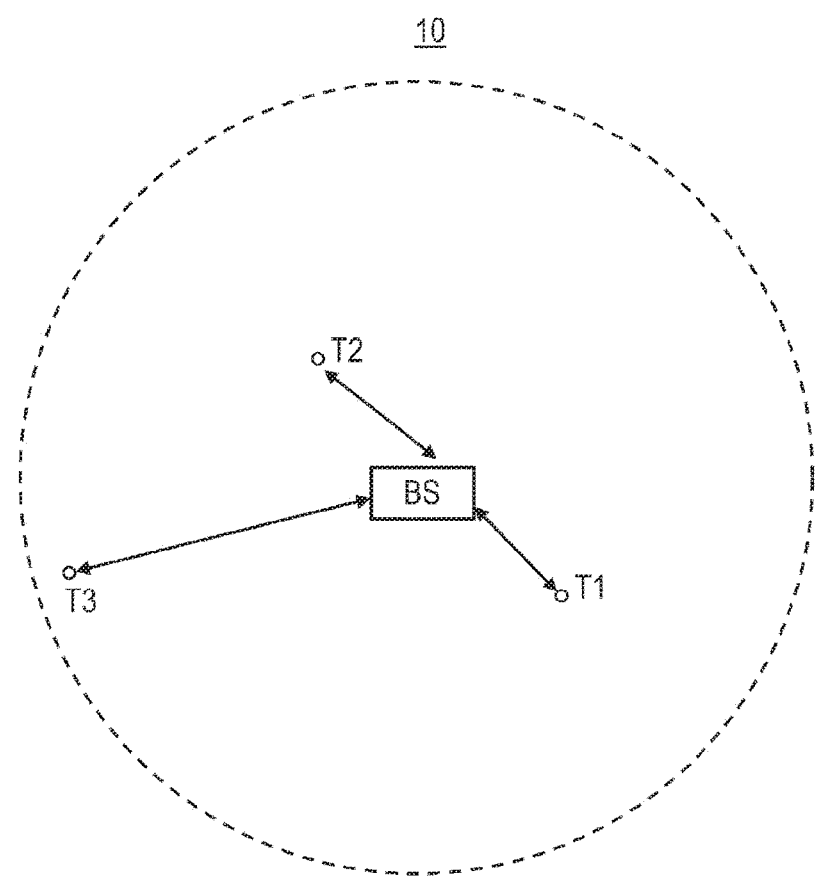
FIG. 7B is a schematic diagram for describing the second application example of the wireless communication system according to the first exemplary embodiment.

FIGS. 7A and 7B are schematic diagrams for describing a second application example of wireless communication system 10. In the second application, whether or not a repeater that performs relaying between the BS and terminal T is considered.

In FIGS. 7A and 7B, a distance between terminals T1 and T2 and the BS is comparatively short, and the wireless communication between with terminals T1 and T2 and the BS is possible with a normal clock frequency. More precisely, it is assumed that terminals T1 and T2 and the BS are located within a range for the maximum transfer distance. Furthermore, it is assumed that a distance between terminal T3 and the BS is comparatively long and the wireless communication that uses a normal clock frequency is difficult, and thus that the reduction of the operation clock makes the wireless communication between terminal T3 and the BS possible. More precisely, it is assumed that terminal T3 and the BS are located within the range for the maximum transfer distance that results from reducing the clock frequency. Each of terminals T1, T2, and T3 in the second application example is one example of terminal T.

FIG. 7A illustrates an outline of wireless communication system X2 in a second comparative example that is compared against the second application example.

Wireless communication system X2 has repeater 300X that relays the wireless communication between the BS and terminal T. In wireless communication system X2, in a case where the BS is present within the range for the maximum transfer distance in compliance with prescribed wireless communication specification, terminal T directly performs the wireless communication with the BS (refer to terminals T1 and T2 in FIG. 7A).

On the other hand, in wireless communication system X2, in a case where the BS is not present within the range for the maximum transfer distance in compliance with the prescribed wireless communication specification, terminal T performs the wireless communication with the BS through repeater 300X (refer to terminal T3 in FIG. 7A).

FIG. 7B illustrates an outline of wireless communication system 10 in the second application example. Wireless communication system 10 does not have a repeater as illustrated in FIG. 7A.

In wireless communication system 10, terminal T in advance agrees with the BS that terminal T performs the wireless communication with the BS in compliance with the same wireless communication specification, for example, in a state where communication control CPU 117 reduces the operation clock. Terminal T performs the wireless communication with the BS in a state where the operation clock is reduced. Accordingly, in FIG. 7B, any one of terminals T1, T2, and T3 can directly perform the wireless communication with the BS.

According to the second application example, because the maximum transfer distance, for example, is increased by several fold, repeater 300X can be made unnecessary. For example, when wireless communication system 10 is established in a systematic manner, repeater 300X can be set to be unnecessary. Furthermore, for example, repeater 300X can be removed in a state where wireless communication system 10 that has repeater 300X is in operation.

Figure 8A:
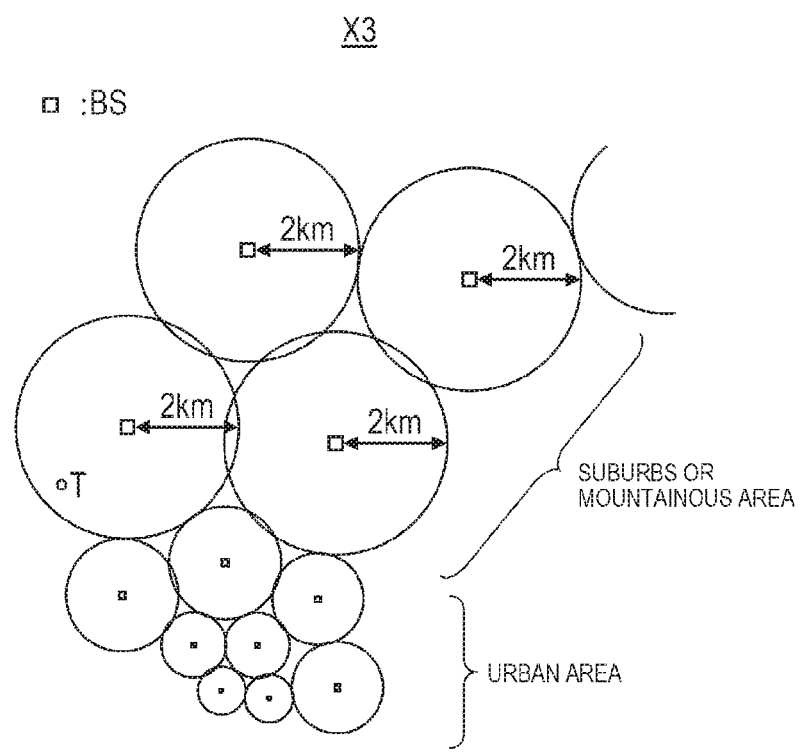
FIG. 8A is a schematic diagram for describing a third application example of the wireless communication system according to the first exemplary embodiment.
Figure 8B:
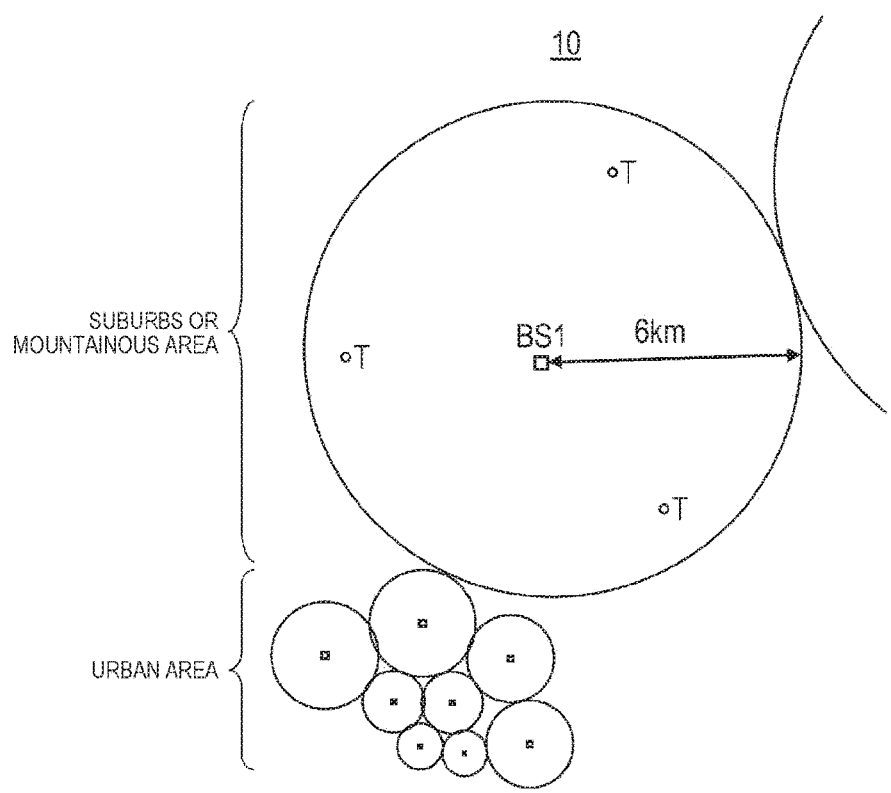
FIG. 8B is a schematic diagram for describing the third application example of the wireless communication system according to the first exemplary embodiment.

FIGS. 8A and 8B are schematic diagrams for describing a third application example of wireless communication system 10. In the third application, wireless communication system 10 as a cellular system in which a plurality of BSs are present and a plurality of cells of the BS that have different cell radii are present in a mixed manner is considered. Because the cell radius indicates an area that is covered by the BS, the cell radius is equivalent to the maximum transfer distance for the BS.

FIG. 8A illustrates an outline of wireless communication system X3 in a third comparative example that is compared against the third application example.

In FIG. 8A, a plurality of cells of the BS, a cell radius of which is a first prescribed length (for example, 2 km), are present. The cell of the BS, the cell radius of which is the first prescribed length, for example, is provided in suburbs or a mountainous area.

Furthermore, in FIG. 8A, a plurality of cells of the BS, a cell radius of which is a second prescribed length (for example, 200 m) shorter than the first prescribed length, are present. The cell of the BS, the cell radius of which is the second prescribed length, for example, is provided in an urban area.

In wireless communication system X3, in order to make possible the communication between the BS and terminal T, even in an area (for example, suburbs or a mountainous area) where traffic is at a low level, it is necessary to install the BS with the cell radius being 2 km.

FIG. 8B illustrates an outline of wireless communication system 10 in the third application example. In wireless communication system 10, terminal T in advance agrees with the BS that terminal T performs the wireless communication with the BS in compliance with the same wireless communication specification, for example, in the state where communication control CPU 117 reduces the operation clock.

Furthermore, terminal T in advance agrees with the BS that, for example, communication control CPU 117 determines the frequency bandwidth based on the cell radius for the BS that is the closest to terminal T and that terminal T performs the wireless communication in the determined frequency bandwidth. When the frequency bandwidth is determined, the clock frequency is determined.

For example, in a case where the wireless communication specification is for LTE, a basic clock frequency for LTE is 30.72 MHz. In order to increase the cell radius, when the basic clock frequency is configured to be 1.92 MHz which is one-sixteenth of 30.72 MHz, the frequency bandwidth of the wireless signal is reduced to one-sixteenth of the frequency bandwidth itself and the transmit power density (unit: Watt/Hz) is increased by sixteen fold in the condition that the transmit power (unit: Watt) is constant. For this reason, it is possible that terminal T increases the transfer distance (the maximum transfer distance) over which the transmission signal is able to be transmitted, by four fold, in the free space (a receive power is reduced as a result of the second power of the distance), and by two fold, in space (for example, a receive power is reduced as a result of the fourth power of the distance) in which a propagation loss depends more heavily on the distance.

The expression "in the condition that the transmit power (unit: Watt) is constant" is intended to mean that the maximum value of the transmit power is stipulated in various wireless communication specification, but that the transmit power density is increased in a state where this stipulation is complied with and thus the maximum transfer distance is increased.

Terminal T performs the wireless communication with the BS in the frequency bandwidth described above in a state where the operation clock is reduced. Accordingly, the communication distance for terminal T can be increased, and the cell radius for the BS can be increased to a third prescribed length (for example, approximately 6 km) that is longer than the first prescribed length.

According to the third application example, even in a situation where cells of base station 200 that have different cell radii are present in a mixed manner, in a case where a plurality of wireless communication specifications are not prepared and where terminal 100 belongs to any base station 200, the wireless communication can be performed using singular wireless communication specification between terminal 100 and base station 200. Furthermore, the maximum transfer distance for each of terminal 100 and base station 200 can be increased and thus the number of BSs that are installed in an area where traffic is at a low level can be reduced. Because of this, the cost of installing the BS can be reduced. Furthermore, because the frequency bandwidth or the clock frequency that is used by terminal 100 and base station 200 which are used for the wireless communication is determined considering the cell radius for the BS, although the distance is increased, communication quality can be maintained for the wireless communication.

According to the third application example, basically, the cell radius for base station 200, which is the first prescribed length that is comparatively long in terms of cell radius, is further increased, and the cell radius for base station 200, which is the second prescribed length that is comparatively short in terms of cell radius, remains unchanged. Accordingly, in an urban area, even in a case where the number of users of terminal 100 increases and thus the traffic is busy, an excessive load that is beyond communication capacity of base station 200 can be suppressed from being applied to base station 200 for accommodation.

Figure 9A:
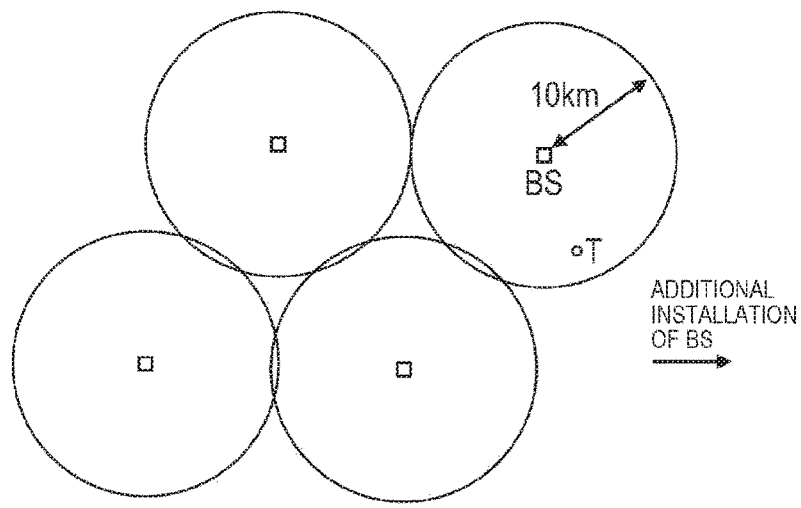
FIG. 9A is a schematic diagram for describing a fourth application example of the wireless communication system according to the first exemplary embodiment.
Figure 9B:
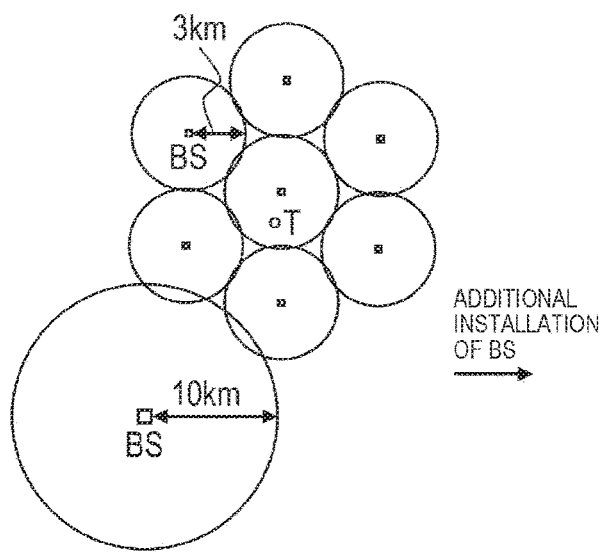
FIG. 9B is a schematic diagram for describing the fourth application example of the wireless communication system according to the first exemplary embodiment.
Figure 9C:
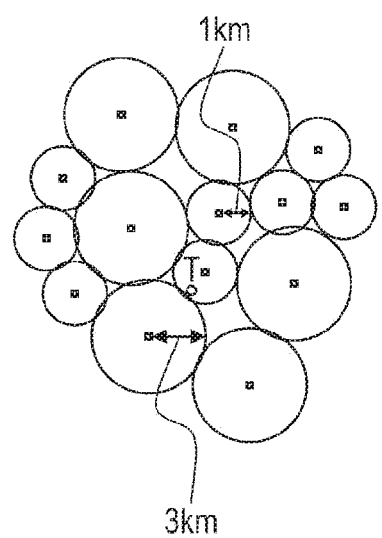
FIG. 9C is a schematic diagram for describing the fourth application example of the wireless communication system according to the first exemplary embodiment.

FIGS. 9A to 9C are schematic diagrams for describing a fourth application example of wireless communication system 10. In the fourth application example, an additional installation of the BS is considered.

FIG. 9A illustrates an example of an arrangement of cells of each BS in a case where the number of subscribers to terminal T is H1.

In FIG. 9A, terminal T in advance agrees with the BS that, for example, communication control CPU 117 reduces the operation clock in compliance with a prescribed wireless communication specification and thus sets the frequency bandwidth to be one-hundredth of the normal frequency bandwidth specification. Terminal T performs the wireless communication with the BS in the frequency bandwidth described above in a state where the operation clock is reduced.

Accordingly, the cell radius for the BS, for example, is set to be 10 km and the number of BSs that are installed is greatly reduced, and thus wireless communication system 10 can be established.

FIG. 9B is a schematic diagram illustrating an example of an arrangement of cells of each BS in a case where the number of subscribers to terminal T increases from a state in FIG. 9A and the number of subscribers is H2 (>H1).

In FIG. 9B, the BS is additionally installed, and the cell radius for each BS is decreased. Information relating to a new cell radius that accompanies the additional installation of the BS, for example, is remotely configured, for example, by a network Operations, Administrations and Maintenance (OAM) function, for example, through an upstream device (for example, an RNC or an S·GW), which is not illustrated, or is configured by performing a changing operation directly on the BS.

In FIG. 9B, terminal T in advance agrees with the BS that, for example, communication control CPU 117 reduces the operation clock in compliance with the prescribed wireless communication specification and thus sets the frequency bandwidth to be one-tenth of the normal frequency bandwidth. Terminal T performs the wireless communication with the BS in the frequency bandwidth described above in a state where the operation clock is reduced.

Accordingly, the cell radius for the BS, for example, is set to be 3 km and the number of BSs that are installed is reduced, and thus wireless communication system 10 can be established.

FIG. 9C is a schematic diagram illustrating an example of an arrangement of cells of each BS in a case where the number of subscribers to terminal T increases further from a state in FIG. 9B and the number of subscribers is H3 (>H2). In FIG. 9C, the BS is further additionally installed, and the cell radius for each BS is further decreased.

In FIG. 9C, terminal T in advance agrees with the BS that, for example, communication control CPU 117 determines the frequency bandwidth (which is less than one-tenth of the frequency bandwidth at the normal time) based on the cell radius for the BS and that terminal T performs the wireless communication in the determined frequency bandwidth. Terminal T performs the wireless communication with the BS in the frequency bandwidth described above in a state where the operation clock is reduced.

Accordingly, the cell radius for the BS, for example, is set to be 1 km and the number of BSs that are installed is reduced, and thus wireless communication system 10 can be established. Furthermore, because the frequency bandwidth that is used for the wireless communication is determined considering the cell radius for the BS, although the BS is additionally installed, the communication quality can be maintained for the wireless communication.

According to the fourth application example, in a case where the number of subscribers to terminal 100 is small at an initial stage where wireless communication system 10 is installed, the number of base stations 200 that are installed can be reduced. Furthermore, base station 200 can be additionally installed in stages as the number of subscribers to terminal 100 increases.

Next, the operation example of the operation of wireless communication system 10 is described.

In the following operation example, it is assumed that the clock frequency of the operation clock of each of terminal 100 and base station 200 is configured to be any one of f0, f1, f2, f3, and f4. When an arrangement in order of decreasing a frequency is f0>f1>f2>f3>f4, f0 illustrates the clock frequency at the normal time, and f4 is the lowest frequency of the operation clock.

The following operation example may apply to any one of the application examples described above.

Figure 10:
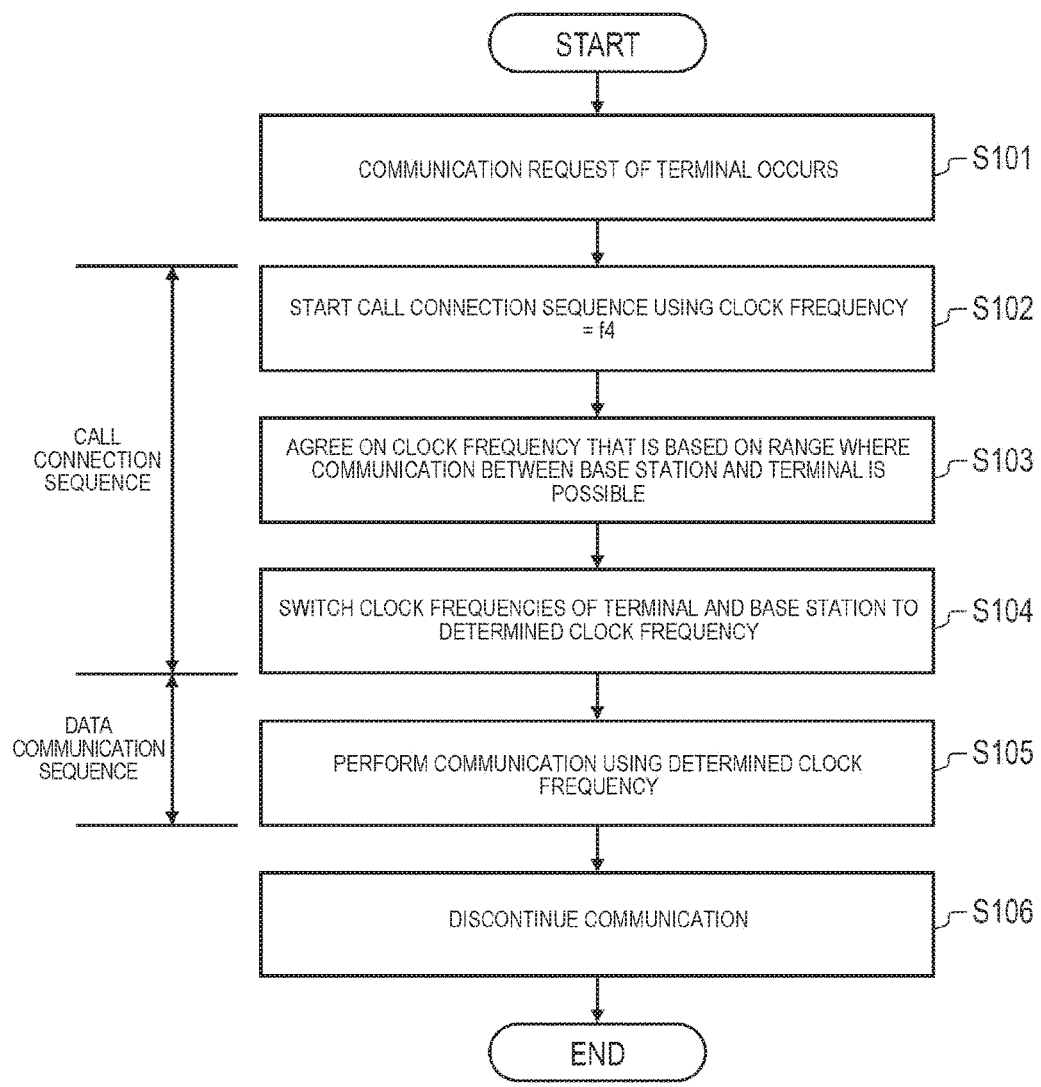
FIG. 10 is a sequence diagram illustrating a first operation example of operation of the wireless communication system according to first exemplary embodiment.

FIG. 10 illustrates a first operation example of the operation of wireless communication system 10. First operation examples include an operation relating to the call connection sequence. In the call connection sequence in FIG. 10, for example, it is assumed that an operation clock is used at which the maximum transfer distance for each of terminal 100 and base station 200 is maximized. The call connection sequence is one example of a first communication sequence.

The first operation example includes a data communication sequence that follows the call connection sequence. The data communication sequence is one example of a second communication sequence. In the data communication sequence, an operation clock is used that corresponds to the frequency bandwidth which is derived in the call connection sequence.

First, in terminal 100, communication control CPU 117 causes a communication request to be generated (S101). Communication control CPU 117 configures the clock frequency of the operation clock to be f4, and causes the call connection sequence to be started (S102). Communication control CPU 117 transmits a notification that the call connection sequence is started, to base station 200. Clock frequency f4 here is one example of the first clock frequency.

In base station 200, when receiving the notification that the call connection sequence is started, from terminal 100, communication control CPU 217 causes the call connection sequence to be started between base station 200 itself and terminal 100. Communication control CPU 217 configures the clock frequency to be f4, in a waiting state that is attained before the call connection sequence is started.

In the call connection sequence, various pieces of control data are communicated between terminal 100 and base station 200. The pieces of controls data, for example, include pieces of information, such as a maximum transmit power of terminal 100, a maximum transfer speed that terminal 100 is capable of supporting, and a carrier frequency that terminal 100 is capable of supporting. The control data is one example of first data.

Each of communication control CPUs 117 and 217 causes terminal 100 and base station 200 to agree on which one of clock frequencies f0 to f4 is used and which one of clock frequencies f0 to f4 the frequency bandwidth to be used corresponds to (S103).

In base station 200, the maximum transfer distance is decided according to the frequency bandwidth of the wireless signal, and the cell radius for base station 200 is decided according to the maximum transfer distance. In S103, for example, communication control CPU 217 recognizes how large or small the cell radius for base station 200 itself, and information on the cell radius is notified to terminal 100. In terminal 100, communication control CPU 217 receives the information on the cell radius from base station 200, and, based on the cell radius, derives the clock frequency of terminal 100. On the other hand, in base station 200, based on the cell radius for base station 200, communication control CPU 217 derives the clock frequency of base station 200.

Accordingly, terminal 100 can derive the clock frequency to be used, without retaining the information on the cell radius for base station 200 in advance. The information on the cell radius is one example of information indicating a range where base station 200 is capable of performing the communication, and information indicating a range where the communication is possible outside of a circular area with the cell radius may be notified.

The range where the communication is possible, for example, is determined based on a cell radius, a positional relationship between terminal 100 and base station 200 and an amount of radio wave propagation loss between terminal 100 and base station 200, which is assumed. More precisely, pieces of information on the range where the communication is possible, for example, include pieces of information, such as the cell radius, the positional relationship between terminal 100 and base station 200 and the amount of radio wave propagation loss between terminal 100 and base station 200, which is assumed. Which information on the range where the communication is possible the maximum transfer speed (which varies according to the clock frequency) for the data communication is determined and is agreed between terminal 100 and base station 200 based on is flexibly configured for every wireless communication system 10.

Processing in each of S102 to S104 indicates processing relating to the call connection sequence. In the call connection sequence, the clock frequency (one example of the second clock frequency) for performing the data communication of the real data is derived.

Communication control CPUs 117 and 217 configure (changes) multiplying factors of clock generators 118 and 218 in such a manner that any one of agreed-on clock frequencies f0 to f4 is available. More precisely, communication control CPUs 117 and 217 configure the clock frequency to be any one of agreed-on clock frequencies f0 to f4 (S104).

Communication control CPUs 117 and 217 perform control in such a manner that the wireless communication is performed between terminal 100 and base station 200 using the operation clock that is generated with the configured multiplying factor, more precisely, using the clock frequency (S105). In this case, communication control CPU 117 controls each unit of terminal 100 in such a manner that the wireless communication is performed, and communication control CPU 217 controls each unit of base station 200 in such a manner that the wireless communication is performed. In S105, the real data (user data) that has to be sent from terminal 100 to base station 200 is communicated. The user data is one example of second data.

Processing in S105 is repeated until the communication (the data communication) of the user data is completed. The processing in S105 indicates processing relating to the data communication sequence.

When the data communication is completed, communication control CPUs 117 and 217 disconnects a communication connection (for example, a communication session or a call connection) between terminal 100 and base station 200 (S106).

According to the first operation example, terminal 100 and base station 200 increases the power density of the wireless signal in the call connection sequence, and thus increase the maximum transfer distance. Therefore, even in a case where a distance between terminal 100 and base station 200 is comparatively a remote distance, an establishment of a communication session and an establishment of a call connection between terminal 100 and base station 200 can be easily performed.

Clock frequency f4 in the call connection sequence is one example, and is intended to indicate that the transfer distance is increased if possible. For example, if clock frequency f3 is a prescribed frequency or higher at which a desired transfer distance is able to be realized, the clock frequency in the call connection sequence may be set to be f3.

Figure 11:
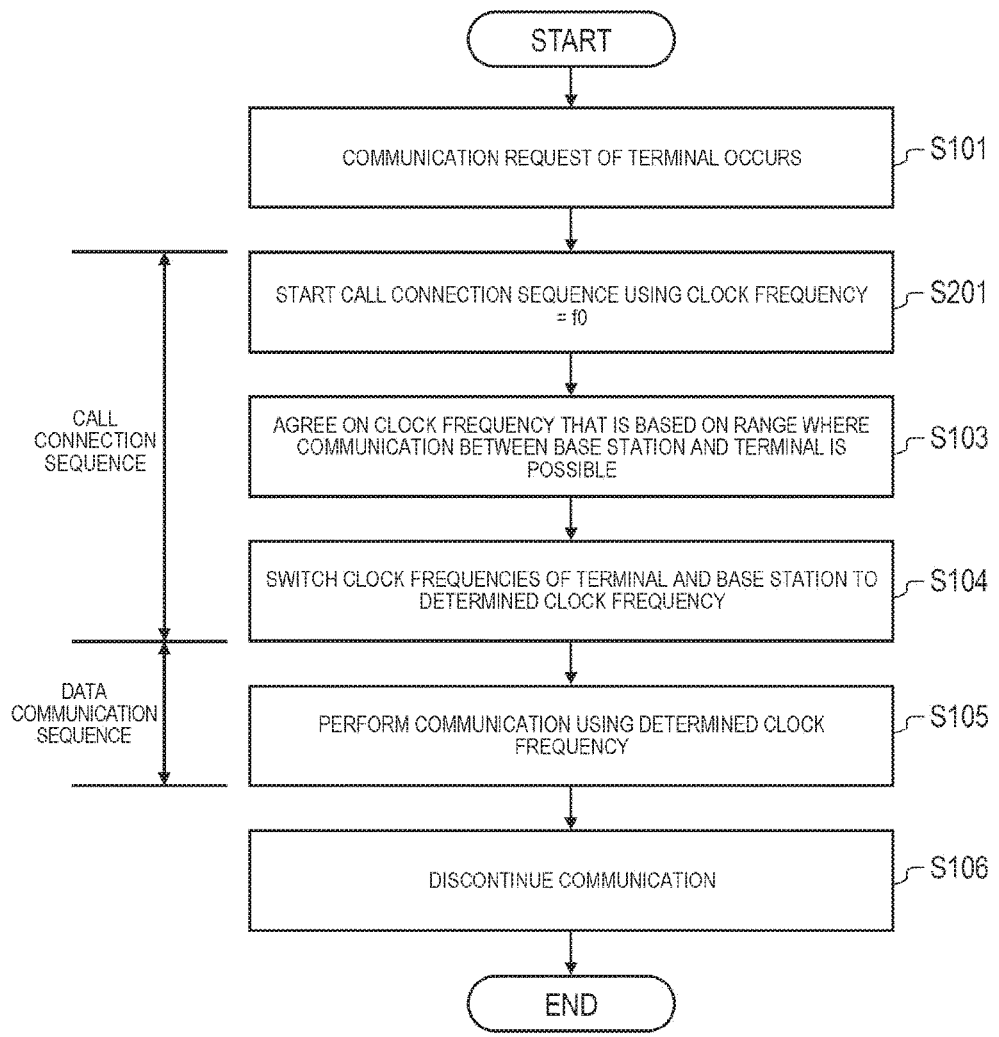
FIG. 11 is a sequence diagram illustrating a second operation example of the operation of the wireless communication system according to the first exemplary embodiment.

FIG. 11 illustrates a second operation example of the operation of wireless communication system 10. Second operation examples include operation relating to the call connection sequence and the data communication sequence. In the call connection sequence in FIG. 11, for example, it is assumed that the maximum transfer distance for each of terminal 100 and base station 200 is within a range in which the communication is possible and that the clock frequency is one of types of maximum clock frequencies.

In this case, terminal 100 and base station 200, for example, may perform error correction and may perform an Automatic Repeat Request (ARQ). Accordingly, the communication quality that results from the maximum transfer distance being short can be prevented from being degraded.

In FIG. 11, the same step as in FIG. 10 is given the same reference numeral, and a description thereof is omitted or simplified.

After the processing in S101, in terminal 100, communication control CPU 117 configures clock frequency of the operation clock to be f0, and causes the call connection sequence to be started (S201). Communication control CPU 117 transmits the notification that the call connection sequence is started, to base station 200.

In base station 200, when receiving the notification that the call connection sequence is started, from terminal 100, communication control CPU 217 causes the call connection sequence to be started between base station 200 itself and terminal 100. Communication control CPU 217 configures the clock frequency to be f0, in the waiting state that is attained before the call connection sequence is started.

After the processing in S201, terminal 100 and base station 200 performs the processing in each of S103 to S106.

According to the second operation example, terminal 100 and base station 200 can increase a larger amount of communication traffic in the call connection sequence than in the first operation example, and the more time taken for the call connection sequence is shortened than in the first operation example. Thus, power saving is accomplished. Because an amount of transmission data is smaller in the call connection sequence than in the data communication sequence, even in a case where retransmission control is performed in the second operation example, an influence due to the retransmission, such as a delay, is small.

Clock frequency f0 in the call connection sequence is one example, and is intended to secure as high processing performances of terminal 100 and base station 200 as possible. For example, if clock frequency f1 is equal to or lower than a prescribed frequency at which a desired processing performance is able to be realized, clock frequency in the call connection sequence may be set to be f1.

Figure 12:
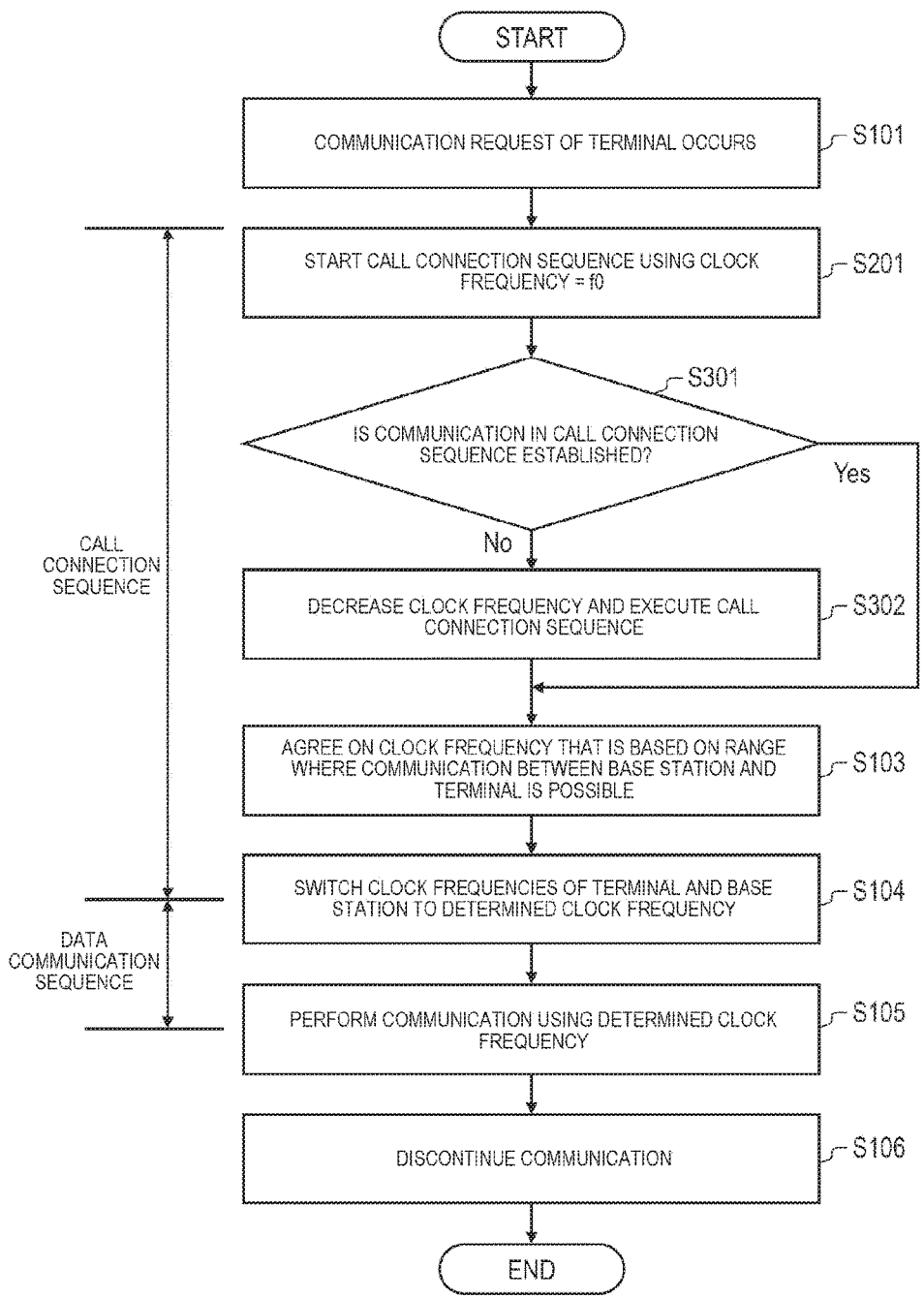
FIG. 12 is a sequence diagram illustrating a third operation example of the operation of the wireless communication system according to the first exemplary embodiment.

FIG. 12 illustrates a third operation example of the operation of wireless communication system 10. The third operation examples include the operation relating to the call connection sequence. The third operation example is a modification example of the second operation example.

In the third operation example, in a case where communication in the call connection sequence is not established, for example, it is assumed that terminal 100 and base station 200 decreases the clock frequency that is configured, without performing the error correction or the Automatic Repeat Quest.

After the processing in S201, communication control CPUs 117 and 217 determine whether or not the communication in the call connection sequence is established between terminal 100 and base station 200 (S301). Whether or not the communication is established is determined, for example, based on whether or not the control data relating to the call connection sequence is received from the other party device, whether or not a prescribed time that is assumed to be the time taken for the call connection sequence elapses, or whether or not the control data relating to the call connection sequence is impossible to decipher.

In a case where the communication in the call connection sequence is not established, communication control CPUs 117 and 217 configure clock frequencies of terminal 100 itself and base station 200 itself, respectively, to be any one of clock frequencies f1 to f4 that are lower than f0, and execute the call connection sequence (S302). Any one of post-change clock frequencies f1 to f4 is one example of a third operation clock frequency.

Communication control CPUs 117 and 217 may make a change from clock frequency f0 to clock frequency f4 that is a minimum clock frequency, at one time. Communication control CPUs 117 and 217 may make a change from clock frequency f0 to clock frequency f1 that is the next highest frequency, and then may make changes from clock frequency f1 to clock frequencies f2 and f3 sequentially. Other changing methods may be available. Communication control CPUs 117 and 217 may perform determination in S301 each time a change is made in such a manner that the clock frequency is decreased.

In a case where the communication in the call connection sequence is established in S301, or after the processing in S302, terminal 100 and base station 200 performs the processing in each of S103 to S106.

According to the third operation example, terminal 100 and base station 200 can gradually decrease the clock frequency in the call connection sequence, and can gradually increase the maximum transfer distance.

In this manner, wireless communication system 10 configure the clock frequency of the operation clock of terminal 100 (one example of a transmitter) and base station 200 (one example of a receiver) to be variable, without changing a radio frame format and communication protocol that comply with a wireless transfer scheme.

According to wireless communication system 10, a combination of the maximum transfer speed and the maximum transfer distance can be made to be variable. For example, wireless communication system 10 configures in advance various required conditions for the maximum transfer speed and the maximum transfer distance in the wireless communication specification to be variable, or configures various required conditions to be variable prior to the communication connection each time the communication connection is made. Accordingly, a wireless performance that satisfies a required condition can be provided with software configurations and hardware configurations of terminal 100 and base station 200 remaining almost the same as before.

Furthermore, for example, as a result of devising a way to adopt the communication specification without making any change to the communication specification, wireless communication system 10 can increase the maximum transfer distance at the expense of the maximum transfer speed. Furthermore, wireless communication system 10, for example, can increase the transfer distance by five fold or ten fold without changing the transmit power.

Furthermore, for example, in a case where base station 200 communicates with many terminals, such as 50 terminals 100 or 100 terminal 100, base station 200 performs the operation examples described above between base station 200 itself and the many terminals 100. In this case, base station 200, for example, performs switching between terminals 100 on the time axis for communication processing between base station 200 itself and each terminal 100.

According to wireless communication system 10, for example, a system can be provided in which a robot (one example of terminal 100) moving in a farm captures an image and transmits temperature, carbon dioxide concentration, and the like to a sensor (one example of base station 200). When wireless LAN communication is used for a communication scheme for wireless communication system 10, the maximum transfer speed is high, but the maximum transfer distance is short. On the other hand, when DECT communication is used for the communication scheme for wireless communication system 10, the maximum transfer distance is long, but the maximum transfer speed is low. According to wireless communication system 10, for example, the transfer distance in the wireless LAN communication can be increased, and robust communication is possible.

Furthermore, as wireless communication system 10, a cellular system in which communication of the control data is performed between base station 200 with a large cell radius and terminal 100 and the communication of the user data is performed between base station 200 with a small cell radius and terminal 100 is assumed. In this case, wireless communication system 10 decreases the clock frequencies of terminal 100 and base station 200 in the communication of the control data, and increases the clock frequencies of terminal 100 and base station 200 in the communication of the user data. Therefore, wireless communication system 10 can cause the wireless communication specification (for example, the radio frame format or the communication protocol) to be used in common use for the control data and the user data.

Furthermore, in wireless communication system 10, the clock frequencies of terminal 100 and base station 200 can be configured to be small, and thus the maximum transfer distance can be increased thereby making the repeater unnecessary.

Furthermore, in a case where, in wireless communication system 10, base stations 200 are deployed over a whole area, in base station 200 that has a large cell radius, the clock frequencies of terminal 100 and base station 200 can be configured to be small, and thus the maximum transfer distance can be increased. Accordingly, the wireless communication specification for wireless communication system 10 in which the deployment of base stations 200 with different cell radii over a whole area is performed can be unified.

Furthermore, in wireless communication system 10, in a case where base stations 200 are additionally installed in phases according to a trend in which the number of subscribers increases, the number of base stations 200 is configured to be small, and at the point in time when the cell radius of base station 200 is great, the clock frequencies of terminal 100 and base station 200 are configured to be small. Accordingly, the maximum transfer distance can be increased. In wireless communication system 10, base station 200 is additionally installed as the number of subscribers increases, and the operation clock frequencies of terminal 100 and base station 200 are configured to be high at a point in time when the cell radius of base station 200 is small. Accordingly, the maximum transfer speed (an amount of traffic that base station 200 is able to accommodate) can be increased.

Furthermore, it is assumed that, in access to a database for the white space, which is performed prior to the wireless communication that uses the frequency in the white space, wireless communication system 10 uses a frequency band that has a larger propagation loss than the white space. In this case, in communication for the access to the database for the white space, the clock frequencies of terminal 100 and base station 200 are decreased. Accordingly, for example, the maximum transfer distance can be increased in a range in which a demanded transfer speed is achieved. Therefore, the maximum transfer distance in the communication that uses the frequency in the white space and the maximum transfer distance in the communication for the access to the database for the white space can be set to be the same, and base station 200 can be used for both of the communications.

Second Exemplary Embodiment

In a second exemplary embodiment, the execution of the call connection sequence by the terminal using any operation clock without in advance determining the operation clock (the clock frequency) at the time of the execution of the call connection sequence by the terminal and the base station is described. In the present exemplary embodiment, descriptions of matters that are the same as the matters described in the first exemplary embodiment are omitted or simplified.

As a wireless communication device according to the present exemplary embodiment, base station 200A is provided instead of base station 200 that is illustrated in FIG. 1. More precisely, wireless communication system 10A (which is equivalent to wireless communication system 10 in FIG. 1 and whose illustration is omitted) according to the present exemplary embodiment includes terminal 100 and base station 200A.

Figure 13:
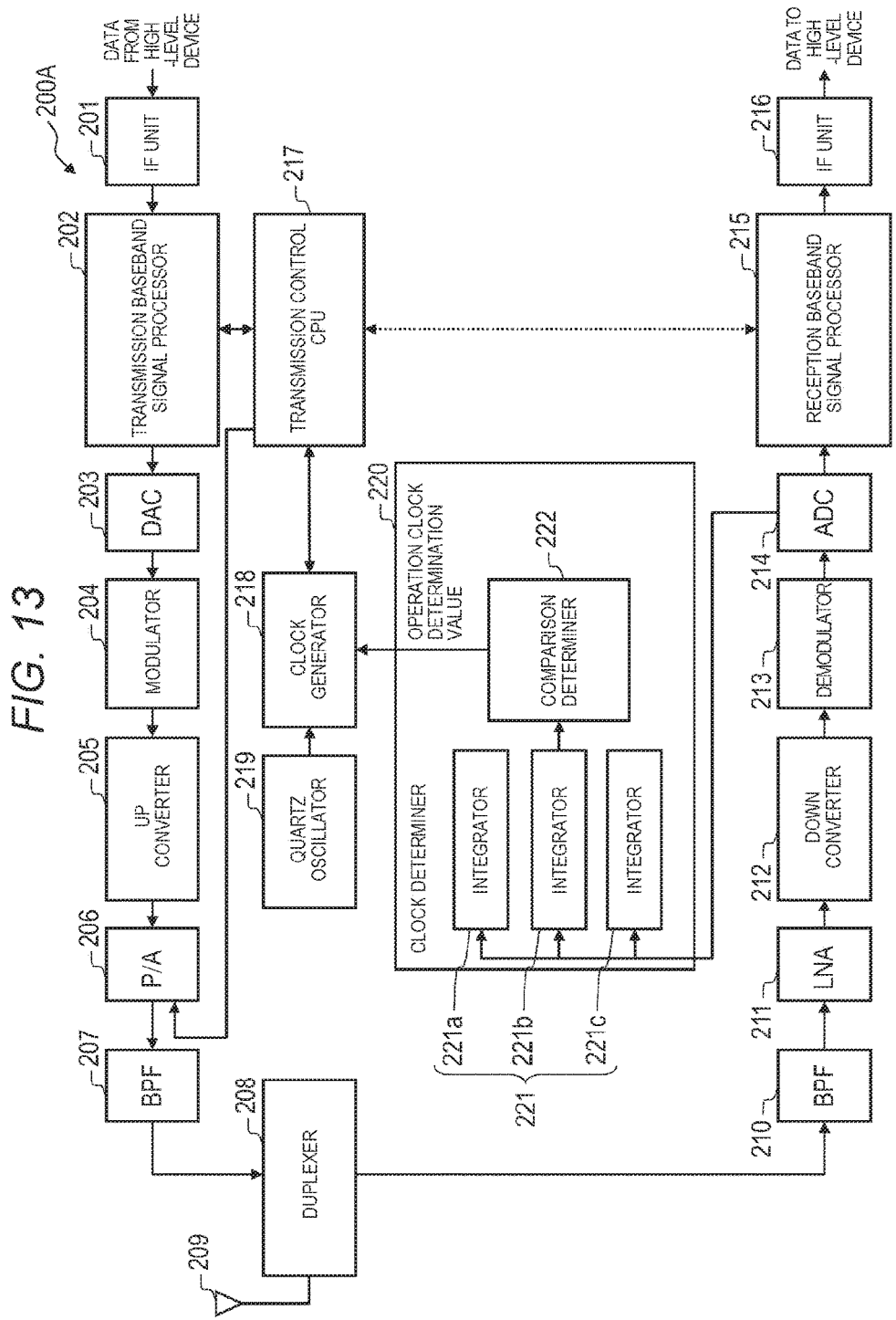
FIG. 13 is a block diagram illustrating an example of a base station according to a second exemplary embodiment.

FIG. 13 illustrates a configuration example of base station 200A. When compared with base station 200 that is illustrated in FIG. 3, base station 200A that is illustrated in FIG. 13 includes clock determiner 220 in addition to the constituent units of base station 200.

Although not illustrated in detail, BPF 210, for example, is designed as an analog circuit. In a case where BPF 210 is the analog circuit, a plurality of BPFs 210 are prepared according to the number (more precisely, the number of clock frequencies) of operation clocks. For example, in a case where five frequencies, f0, f1, f2, f3, and f4 are assumed as the clock frequencies of the operation clock, five BPFs 210 are prepared. Also in the first exemplary embodiment, a plurality of BPFs 210 are prepared if necessary.

In the same manner, the case of BPF 210 of base station 200A applies to BPF 107 of terminal 100.

ADC 214 outputs digital data (a voltage value, whose unit is, for example, volt (V)) to integrator 221 (for example, integrators 221a, 221b, and 221c) at every clock sampling timing of the maximum transfer speed (for example, 10 Mbps).

Reception baseband signal processor 215 performs the baseband signal processing on data from ADC 214, based on the operation clock that is estimated by clock determiner 220.

Clock determiner 220 includes integrator 221 (221a, 221b, and 221c) and comparison determiner 222.

Clock determiner 220 performs blind rate determination. In the blind rate determination, clock determiner 220 estimates the operation clock that is to be used when terminal 100 transmits data, in a state where information on the clock frequency of the operation clock is not shared between terminal 100 and base station 200A. With the estimated operation clock, the maximum transfer speed or the frequency bandwidth is estimated.

Integrator 221 (for example, integrators 221a, 221b, and 221c) performs integration (for example, voltage-addition) on samples (for example, 10000 samples) that correspond to a prescribed frame length (for example, 1 ms), for every prescribed number of samples (for example, 100 samples, 10 samples, or one sample). Integrator 221 derives (for example, calculates) a square value (a power value, whose unit is, for example, watt (W)) of each value that is obtained by performing the integration. Integrator 221 adds up square values (the number of which is, for example, 100, 1000, or 10000) that are derived, and derives a total value C (for example, C1, C2, or C3).

Integrators 221a, 221b, and 221c are designed in such a manner that the prescribed numbers of samples are different, and derive total values C1, C2, and C3, respectively.

Comparison determiner 222 compares total values C1, C2, and C3 that are derived by integrators 221a, 221b, and 221c, respectively.

Next, an operation example of operation of wireless communication system 10A is described.

The following operation example may apply to any one of the application examples according to the first exemplary embodiment.

FIG. 14 illustrates the operation example of the operation of wireless communication system 10A. In FIG. 14, the same step as in FIG. 10 or FIG. 11 is given the same reference numeral and a description thereof is omitted or simplified.

FIG. 14 illustrates that any one of three types, that is, 0.1 Mbps, 1 Mbps, and 10 Mbps is selected as the maximum transfer speed in the call connection sequence in terminal 100 and base station 200A. Furthermore, it is illustrated that one frame length is selected from among three types, that is, 100 ms, 10 ms, and 1 ms. Furthermore, it is illustrated that 10000 bits are included in one frame length.

After the processing in S101, communication control CPU 117 receives a pilot signal that is periodically transmitted by base station 200, and, based on a reception level of the pilot signal, for example, configures the clock frequency to be any one of frequencies f0 to f4 (S401). The reception level, for example, is proportional to a transfer loss, not a simple transfer distance, for example, when considering a communication environment (for example, communication in an environment where there are surrounding high rise buildings in the vicinity). The pilot signal is one example of the control signal from base station 200.

The pilot signal, for example, includes a base station ID of base station 200, and is used by terminal 100 for recognizing a location of terminal 100 itself. Furthermore, in a case where terminal 100 receives a plurality of pilot signals, for example, the clock frequency is configured based on the reception level of the pilot signal that has a maximum reception strength.

Communication control CPU 117 recognizes base station 200 that is a connection destination, from the base station ID of the pilot signal. Based on the reception level of the pilot signal, communication control CPU 117, for example, can recognize whether terminal 100 is located in the center portion of a communication area that is covered by the base station 200 that is the connection destination, or terminal 100 is located in a peripheral portion of the communication area.

Accordingly, communication control CPU 117 derives the maximum transfer distance necessary for terminal 100 to perform the communication, and, based on the derived maximum transfer distance, can derive the clock frequency that is used for the call connection sequence. The clock frequency that is used for the call connection sequence is any one of f0 to f4.

Communication control CPU 117 configures the multiplying factor of clock generator 118 in such a manner that the multiplying factor of clock generator 118 is the derived clock frequency. More precisely, communication control CPU 117 configures the clock frequency that is used for the call connection sequence (S402). Communication control CPU 117 causes the call connection sequence to be started, using the configured clock frequency (S403).

After the processing S403, terminal 100 performs the processing in each of S103 to S106.

On the other hand, in S103, base station 200A agrees with terminal 100 as to the clock frequency that is used for the data communication sequence, but does not know the clock frequency of terminal 100 in the call connection sequence.

When the control data from terminal 100, which relates to the call connection sequence, is received in base station 200A, ADC 214 outputs the digital data to integrators 221a,

221b, and 221c at every clock sampling timing of 10 Mbps that is the maximum transfer speed.

The digital data from ADC 214 is input into integrator 221a, and integrator 221a derives a square value of a value that is obtained by performing the integration on 10000 samples that correspond to 1 ms, for every 100 samples, and derives total value C1 of 100 square values.

The digital data from ADC 214 is input into integrator 221b, and integrator 221b derives a square value of a value that is obtained by performing the integration on 10000 samples that correspond to 1 ms, for every 10 samples, and derives total value C2 of 1000 square values.

The digital data from ADC 214 is input into integrator 221c, and integrator 221c derives a square value of a value that is obtained by performing the integration on 10000 samples that correspond to 1 ms, for every one sample, and derives total value C3 of 10000 square values.

Comparison determiner 222 compares total values C1, C2, and C3 from integrators 221a, 221b, and 221c, respectively.

For example, in a case where it is determined that C1>C2 and C1>C3, comparison determiner 222 determines that the maximum transfer speed in the call connection sequence is 0.1 Mbps. This is because pieces of data with the same code are successive for every 100 samples.

For example, in a case where it is determined that C2>C1 and C2>C3, comparison determiner 222 determines that the maximum transfer speed in the call connection sequence is 1 Mbps. This is because pieces of data with the same code are successive for every 10 samples.

For example, in a case where it is determined that C3>C1 and C3>C2, comparison determiner 222 determines that the maximum transfer speed relating to the call connection sequence is 10 Mbps. This is because a code of data can change for every one sample.

Comparison determiner 222 sends an operation clock determination value including information on the determined maximum transfer speed, to clock generator 218. The clock generator 218 changes the clock frequency of the operation clock that is generated, to the clock frequency (for example, 0.1 MHz, 1 MHz, or 10 MHz) that corresponds to the maximum transfer speed. The change of the clock frequency changes and configures the clock frequency at which ADC 214 or other constituent units in base station 200A operate. The changed clock frequency is consistent with the clock frequency of terminal 100 that is derived in S401.

Communication control CPU 217 configures the multiplying factor of clock generator 218 in such a manner that the configured clock frequency is attained. More precisely, communication control CPU 117 configures the clock frequency that is used for the call connection sequence.

In S103, base station 200A configures the clock frequency that is used for the call connection sequence, and then performs the same operation as in S103, which is illustrated in the first operation example. More precisely, communication control CPU 217 causes terminal 100 and base station 200A to agree on which one of clock frequencies f0 to f4 that are used for the data communication sequence is used and which one of clock frequencies f0 to f4 the frequency bandwidth to be used corresponds to.

After the clock frequency that is used for the data communication sequence is agreed on in S103, base station 200A performs the processing in each of S104 to S106.

According to wireless communication system 10A, the clock frequency in the call connection sequence can be determined according to the reception level of the pilot signal that is transmitted by base station 200A. Therefore, the clock frequency in the call connection sequence can be flexibly selected according to a location of terminal 100 in a communication area that is covered by base station 200A.

Furthermore, although information relating to the operation clock is not shared in advance between base station 200A itself and terminal 100, that is, although the clock frequency of the operation clock that is used by terminal 100 is unknown, base station 200A can execute the call connection sequence and the data communication sequence between base station 200A itself and terminal 100 by performing the blind rate determination.

The present technology is not limited to the exemplary embodiments described above, and can apply to any configuration that can accomplish functions which are set forth in claims, or functions that are performed by the configuration of each of the present exemplary embodiments.

According to the exemplary embodiments described above, terminal 100 may execute the call connection sequence and the data communication sequence that are illustrated in FIG. 10, 11, 12, or 14, at a timing at which handover is performed between a plurality of base stations 200 and 200A, that is, when is triggered by the handover. Accordingly, terminal 100 can select the clock frequency that are suitable for base stations 200 and 200A that are post-handover connection destinations, and can adequately secure the transfer distance.

According to the exemplary embodiments described above, when the clock frequency bandwidth is decreased, the frequency band is narrowed, and thus noise can be reduced. Therefore, it is also considered that the noise reduction increases the transfer distance to some degree. Therefore, when it comes to the increase in the power density and the increase in the transmit power, terminal 100 and base stations 200 and 200A do not necessarily perform the operation up to the maximum values of the power density and the transmit power in the wireless communication specification, and may perform the operation in such a manner that the power density and the transmit power stay at or less the maximum values described above.

(Outline of Aspects of the Present Technology)

According to an aspect of the present technology, there is provided a wireless communication method in a wireless communication device that performs wireless communication in compliance with a prescribed wireless communication specification, the method including configuring a first clock frequency as a clock frequency of an operation clock of the wireless communication device; executing a first communication sequence in which a second clock frequency is derived, between the wireless communication device itself and a different wireless communication device, using the first clock frequency; configuring the second clock frequency that is derived in the first communication sequence, as the clock frequency of the operation clock of the wireless communication device; and executing a second communication sequence in which data communication is performed, subsequently to the first communication sequence, between the wireless communication device itself and the different wireless communication device, using the second clock frequency.

According to the method, the wireless communication device can dynamically change the clock frequency of the wireless communication device without changing a wireless communication specification (for example, a radio frame format or a communication protocol), and thus can dynamically change a maximum transfer speed and a maximum transfer distance of a wireless signal.

In the wireless communication method according to the aspect of the present technology, the first communication sequence includes a call connection sequence for making a call connection between the wireless communication device and the different wireless communication device.

According to the method, even in a case where the call connection sequence is executed, the wireless communication device can dynamically change the maximum transfer speed and the maximum transfer distance of the wireless signal, without changing the wireless communication specification.

In the wireless communication method according to the aspect of the present technology, a clock frequency that is equal to or lower than a prescribed frequency is configured as the first clock frequency.

According to the method, the wireless communication device can increase a power density that is present at the time of the transmission, and thus can increase a transfer distance.

In the wireless communication method according to the aspect of the present technology, a clock frequency that is equal to or higher than a prescribed frequency is configured as the first clock frequency.

According to the method, the wireless communication device can increase an amount of communication traffic in the wireless communication device.

In the wireless communication method according to the aspect of the present technology, in a case where communication in the first communication sequence that uses the first clock frequency is not established, a third clock frequency that is lower than the first clock frequency is configured as the clock frequency of the operation clock of the wireless communication device, and the first communication sequence is executed using the third clock frequency.

According to the method, from a state where the communication traffic in the wireless communication device is increased, the wireless communication device can increase in phases the power density that is present at the time of the transmission by the wireless communication device and can increase the transfer distance in phases.

In the wireless communication method according to the aspect of the present technology, a control signal is received from the different wireless communication device that communicates with the wireless communication device, and the first clock frequency is configured based on a reception level of the control signal.

According to the method, the wireless communication device can estimate a distance to the different wireless communication device based on the reception level of the control signal. Therefore, the wireless communication device can configure the first clock frequency in such a manner as to achieve a necessary transfer distance.

The wireless communication method according to the aspect of the present technology has a step of acquiring information on a range where the communication by the different wireless communication device is possible, from the different wireless communication device that communicates with the wireless communication device, and a step of deriving the second clock frequency based on the range where the communication by the different wireless communication device is possible.

According to the method, the wireless communication device can dynamically change the maximum transfer speed and the maximum transfer distance of the wireless signal in such a manner that the transfer distance does not run short.

In the wireless communication method according to the aspect of the present technology, the information on the range where the communication is possible includes information on a cell radius for the different wireless communication device.

According to the method, although the information on the cell radius for the different communication device is not retained in advance, the wireless communication device can dynamically change the maximum transfer speed and the maximum transfer distance of the wireless signal using the information on the cell radius from the different communication device.

In the wireless communication method according to the aspect of the present technology, a frequency in white space is configured as a communication frequency of the wireless communication device, a frequency in available white space is derived using the first clock frequency, the second clock frequency is derived based on the frequency in the white space, the derived frequency in the white space is configured as the communication frequency of the wireless communication device, and the second communication sequence is executed using the second clock frequency and the frequency in the white space, which are configured.

According to the method, for example, the transfer distance for the wireless communication device can be increased and thus a database for managing the available white space can be accessed through the different wireless communication device. Therefore, it is unnecessary to install an access point dedicated for accessing the database or to apply a different wireless communication specification (for example, a communication specification for a satellite circuit) from the wireless communication specification for the data communication.

According to another aspect of the present technology disclosure, there is provided a wireless communication device that performs wireless communication in compliance with a prescribed wireless communication specification, including a configuration unit that configures a first clock frequency as a clock frequency of an operation clock of the wireless communication device and that causes a change from the first clock frequency and thus configures a second clock frequency; a communication unit that communicates first data relating to a first communication sequence in which a second clock frequency is derived, between the wireless communication device itself and a different wireless communication device, using the first clock frequency, and that communicates second data relating to a second communication sequence in which data communication is performed, subsequently to the first communication sequence, between the wireless communication device itself and the different wireless communication device, using the second clock frequency; and a derivation unit that derives the second clock frequency based on the first data.

According to this configuration, the wireless communication device can dynamically change the clock frequency of the wireless communication device without changing the wireless communication specification (for example, the radio frame format or the communication protocol), and thus can dynamically change the maximum transfer speed and the maximum transfer distance of the wireless signal.

The disclosed contents of the specification, the drawings, and the abstract, which are included in Japanese Patent Application No. 2014-219490 filed on Oct. 28, 2014, are all incorporated by reference in the present application in it their entireties.

INDUSTRIAL APPLICABILITY

The present technology is useful for a wireless communication method, a wireless communication device, and the like in which a transfer distance over which a wireless signal is transferred can be dynamically changed.

REFERENCE MARKS IN THE DRAWINGS 10, 10A wireless communication system
100 terminal
200, 200A base station (BS)
101, 201 IF
102, 202 transmission baseband signal processor
103, 203 DAC
104, 204 modulator
105, 205 up converter
106, 206 PA
107, 207 BPF
108, 208 duplexer
109, 209 antenna
110, 210 BPF
111, 211 LNA
112, 212 down converter
113, 213 demodulator
114, 214 ADC
115, 215 reception baseband signal processor
116, 216 IF
117, 217 communication control CPU
118, 218 clock generator
119, 219 quartz oscillator
220 clock determiner
221, 221a, 221b, 221c integrator
222 comparison determiner
300X repeater

The invention claimed is:

1. A wireless communication method in a wireless base station that performs wireless communication in compliance with a prescribed wireless communication specification, the method comprising:
configuring a first clock frequency as a clock frequency of an operation clock of the wireless base station;
executing a first communication sequence between the wireless base station and a terminal using the first clock frequency, the first communication sequence including deriving a second clock frequency based on a maximum transfer distance of the wireless base station;
configuring the second clock frequency that is derived in the first communication sequence, as the clock frequency of the operation clock of the wireless base station; and
executing a second communication sequence in which data communication is performed, subsequently to the first communication sequence, between the wireless base station and the terminal using the second clock frequency.

2. The wireless communication method of claim 1, wherein the first communication sequence includes a call connection sequence for making a call connection between the wireless base station and the terminal.

3. The wireless communication method of claim 1, wherein a clock frequency that is equal to or lower than a prescribed frequency is configured as the first clock frequency.

4. The wireless communication method of claim 1, wherein a clock frequency that is equal to or higher than a prescribed frequency is configured as the first clock frequency.

5. The wireless communication method of claim 4, wherein, in a case where communication in the first communication sequence that uses the first clock frequency is not established, a third clock frequency that is lower than the first clock frequency is configured as the clock frequency of the operation clock of the wireless base station, and
wherein the first communication sequence is executed using the third clock frequency.

6. The wireless communication method of claim 1, further comprising:
receiving a control signal from the terminal; and
configuring the first clock frequency based on a reception level of the control signal.

7. The wireless communication method of claim 1, further comprising:
receiving information on a range where communication by the terminal is possible from the terminal, and
deriving the second clock frequency based on the range where the communication by the terminal is possible.

8. The wireless communication method of claim 7, wherein the information on the range where the communication by the terminal is possible includes information on a cell radius for the terminal.

9. The wireless communication method of claim 1, further comprising:
configuring a frequency in white space as a communication frequency of the wireless base station;
deriving a frequency in available white space using the first clock frequency;
deriving the second clock frequency based on the frequency in the white space;
configuring the derived frequency in the white space as the communication frequency of the wireless base station; and
executing the second communication sequence using the configured second clock frequency and the frequency in the white space.

10. The wireless communication method of claim 1, wherein deriving the second clock frequency includes setting the second clock frequency to a first frequency in response to the maximum transfer distance being a first distance, and setting the second clock frequency to a second frequency that is smaller than the first frequency in response to the maximum transfer distance being a second distance that is larger than the first distance.

11. A wireless base station that performs wireless communication in compliance with a prescribed wireless communication specification, comprising:
a configuration unit, which, in operation, configures a first clock frequency as a clock frequency of an operation clock of the wireless base station, and configures a second clock frequency as the clock frequency of the operation clock of the wireless base station;
a communication unit, which, in operation, communicates first data relating to a first communication sequence between the wireless base station and a terminal using the first clock frequency, and communicates second data relating to a second communication sequence in which data communication is performed, subsequently to the first communication sequence, between the wireless base station and the terminal using the second clock frequency; and
a derivation unit, which, in operation, derives, during the first communication sequence, the second clock frequency based on the first data, the first data including a maximum transfer distance of the wireless base station.

12. The wireless base station of claim 11,
wherein the first communication sequence includes a call connection sequence for making a call connection between the wireless base station and the terminal.

13. The wireless base station of claim 11,
wherein the configuration unit, in operation, configures a clock frequency that is equal to or lower than a prescribed frequency as the first clock frequency.

14. The wireless base station of claim 11,
wherein the configuration unit, in operation, configures a clock frequency that is equal to or higher than a prescribed frequency as the first clock frequency.

15. The wireless base station of claim 14,
wherein, in a case where communication in the first communication sequence that uses the first clock frequency is not established, the configuration unit configures a third clock frequency that is lower than the first clock frequency as the clock frequency of the operation clock of the wireless base station, and
wherein the communication unit, in operation, executes the first communication sequence using the third clock frequency.

16. The wireless base station of claim 11,
wherein the configuration unit receives a control signal from the different wireless communication device that communicates with the wireless communication device, and configures the first clock frequency based on a reception level of the control signal.

17. The wireless base station of claim 11,
wherein the derivation unit, in operation, acquires information on a range where communication by the terminal is possible from the terminal, and
wherein the derivation unit, in operation, derives the second clock frequency based on the range where the communication by the terminal is possible.

18. The wireless base station of claim 17,
wherein the information on the range where the communication by the terminal is possible includes information on a cell radius for the terminal.

19. The wireless base station of claim 11,
wherein the derivation unit, in operation, derives a frequency in available white space using the first clock frequency, and derives the second clock frequency based on the frequency in the white space;
wherein the configuration unit, in operation, configures the derived frequency in the white space as a communication frequency of the wireless base station; and
wherein the communication unit, in operation, executes the second communication sequence using the configured second clock frequency and the frequency in the white space.

* * * * *